(12) United States Patent
Hamano et al.

(10) Patent No.: US 7,545,577 B2
(45) Date of Patent: Jun. 9, 2009

(54) ZOOM LENS AND IMAGE PICKUP APPARATUS INCLUDING THE SAME

(75) Inventors: Hiroyuki Hamano, Koga (JP); Kenji Obu, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/038,657

(22) Filed: Feb. 27, 2008

(65) Prior Publication Data
US 2008/0273249 A1    Nov. 6, 2008

(30) Foreign Application Priority Data
Feb. 28, 2007  (JP) ............................ 2007-049012

(51) Int. Cl.
*G02B 15/14* (2006.01)
(52) U.S. Cl. .................... 359/676; 359/568; 359/740
(58) Field of Classification Search ................ 359/432, 359/563, 568, 576, 676, 724, 740, 742
See application file for complete search history.

(56) References Cited

U.S. PATENT DOCUMENTS 6,154,323 A * 11/2000 Kamo ..................... 359/691
6,449,433 B2 * 9/2002 Hagimori et al. .............. 396/72
6,788,464 B2 9/2004 Misaka
7,133,213 B2 11/2006 Hayakawa
7,253,965 B2 8/2007 Shibayama et al.

FOREIGN PATENT DOCUMENTS

JP    2004-117826    4/2004
JP    2004-117827    4/2004

* cited by examiner

*Primary Examiner*—Joseph Martinez
(74) *Attorney, Agent, or Firm*—Canon USA Inc IP Div

(57) ABSTRACT

A compact zoom lens includes a first lens unit disposed closest to an object side, an aperture, and a rear lens group. The first lens unit includes a first diffraction optical part having positive refractive power, and the rear lens group includes a second diffraction optical part having positive refractive power. The power relation between the two diffraction optical parts and the positions of the diffraction optical parts are set appropriately. The zoom lens can have a high zoom ratio wherein chromatic aberration is fully corrected, and an image pickup apparatus employing this zoom lens can be provided.

9 Claims, 16 Drawing Sheets

ZOOM LENS AND IMAGE PICKUP APPARATUS INCLUDING THE SAME

BACKGROUND OF THE INVENTION

1. Field of the Invention

The present invention relates to a zoom lens and an image pickup apparatus incorporating the zoom lens, which can be applied to digital cameras, video cameras, silver-salt photograph cameras, and so forth.

2. Description of the Related Art

In recent years, with image pickup elements employed for an image pickup apparatus such as a digital camera, high pixelation has advanced. In response to this, high resolution has been demanded for imaging lenses (imaging optical systems) employed for image pickup apparatuses including high pixel image pickup elements. In order to realize a high resolution imaging lens, it is useful for various aberrations relating to image capabilities at a single color (single wavelength), such as spherical aberration and coma aberration, to be corrected well. In addition to this, it is useful for an image obtained when employing white illumination light to have well-corrected chromatic aberration so as not to exhibit chromatic bleeding.

On the other hand, in order to enlarge a photographing area, there is demand for imaging lenses to serve as a zoom lens which can have a high zoom ratio. Generally, further lengthening of the focal length at a zoom position at the telephoto end to obtain a high zoom ratio causes an increase in the fluctuation in chromatic aberrations due to zooming and an increase in chromatic aberration of magnification and axial chromatic aberration to occur at a zoom position at the telephoto side.

Accordingly, in order to obtain imaging capabilities of high image quality, it has been important to appropriately perform not only primary spectrum correction but also secondary spectrum correction for correction of chromatic aberration. Note however, attempting to obtain a high zoom ratio causes an increase in the axial chromatic aberration and chromatic aberration of magnification of the secondary spectrum particularly at the telephoto side, which has been difficult to be corrected well.

Heretofore, disposing a lens configured of glass with anomalous partial dispersion within a lens unit at the object side of lens units constituting a zoom lens has been known to correct the chromatic aberration of the secondary spectrum at the telephoto end.

Also, a zoom lens has been known wherein chromatic aberration is corrected by employing a diffraction optical part (diffraction optical face). Providing a diffraction optical part within a lens unit at the object side enables occurrence of chromatic aberration to be reduced at the telephoto side according to the anomalous dispersion effects thereof.

Note however, in a case wherein a diffraction optical part is provided within a lens unit at the object side to correct chromatic aberration at the telephoto side, this diffraction optical part has a few correction effects regarding chromatic aberration at the wide-angle end. Conversely, when attempting to extremely improve chromatic aberration at the telephoto side by increasing the refractive power of the diffraction optical part, the chromatic aberration at the wide-angle end increases.

On the other hand, providing multiple diffraction optical parts within an optical system facilitates chromatic aberration to be corrected at the wide-angle and telephoto end. Of these, a zoom lens has been known wherein multiple diffraction optical parts are disposed before and after an aperture within an optical system (Japanese Patent Laid-Open No. 2004-117826, Japanese Patent Laid-Open No. 2004-117827, and U.S. Pat. No. 6,154,323). Note however, when providing multiple diffraction optical parts within a zoom lens, setting the refractive power thereof and the positions within the optical system thereof improperly makes it difficult to greatly improve chromatic aberration.

With Japanese Patent Laid-Open No. 2004-117826, Japanese Patent Laid-Open No. 2004-117827, and U.S. Pat. No. 6,154,323, multiple diffraction optical parts are provided, but the power thereof is not necessarily arranged to be the optimal relation for correcting chromatic aberration at the telephoto end and wide-angle end. Also, with the positions of the diffraction optical parts within the optical system as well, it cannot be said that priority is given to the correction of chromatic aberration at the telephoto end and wide-angle end.

In order to increase a zoom ratio, and also correct chromatic aberration over the entire zoom range well to obtain high optical performance, it is important to set the positions within the optical system where the diffraction optical parts are provided, the power thereof, and so forth appropriately.

Now, a zoom lens having a four-unit configuration with a high zoom ratio has been known, which is configured of lens units having positive, negative, positive, and positive refractive powers in order from the object side to the image side, and performs zooming by moving each of the lens units (U.S. Pat. No. 7,253,965). Also, a zoom lens having a five-unit configuration with a high zoom ratio has been known, which is configured of lens units having positive, negative, positive, and negative refractive powers in order from the object side to the image side, and performs zooming by moving each of the lens units (U.S. Pat. Nos. 6,788,464 and 7,133,213).

SUMMARY OF THE INVENTION

The present invention provides a zoom lens having high optical performance which is capable of correcting chromatic aberration over the whole zoom region well, and an image pickup apparatus including this zoom lens.

A zoom lens according to an aspect of the present invention is a zoom lens including: a first lens unit having positive refractive power and being closest to an object side; an aperture disposed closer to an image side than the first lens unit; and a rear lens group including one or more lens units at the image side of the aperture. The first lens unit and at least one lens unit among the rear lens group are moved at the time of zooming. The first lens unit includes a first diffraction optical part having positive power, the rear lens group includes a second diffraction optical part having positive power. When assuming that the focal length of the first diffraction optical part is fd1, the focal length of the second diffraction optical part is fd2, the distance between the first diffraction optical part and the aperture is L1 at the telephoto end, the distance between the second diffraction optical part and the aperture is L2 at the wide-angle end, and the focal length of the entire system at the wide-angle end and telephoto end are fw and ft respectively, the following conditional expressions are satisfied $4.0 < fd1/fd2 < 15.0$ $0.3 < L1/ft < 0.9$ $1.5 < L2/fw < 7.0$ Further features of the present invention will become apparent from the following description of exemplary embodiments with reference to the attached drawings.

DESCRIPTION OF THE EMBODIMENTS

Description will be made below regarding embodiments of a zoom lens according to the present invention and an image pickup apparatus including the zoom lens.

First Embodiment

A zoom lens according to the present invention includes a first lens unit having positive refractive power closest to the object side, an aperture closer to the image side than the first lens unit, and a rear lens group including one or more lens units at the image side of the aperture. The first lens unit and at least one lens unit among the rear lens group are moved at the time of zooming.

The first lens unit includes at least a first diffraction optical part having positive power, and the rear lens group includes at least a second diffraction optical part having positive power.

Figure 1:
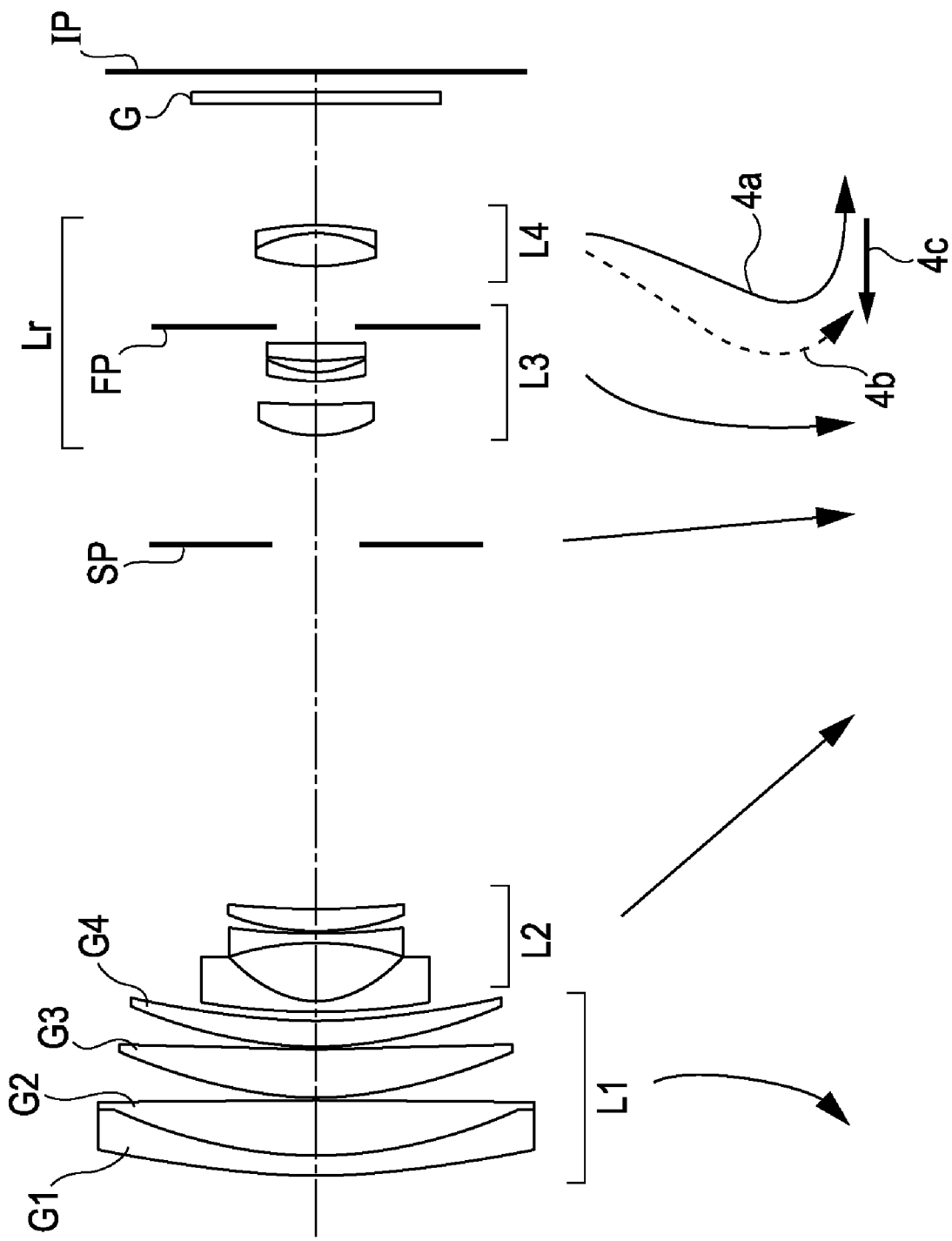
FIG. 1 is a lens cross-sectional view of a first embodiment.
Figure 2:
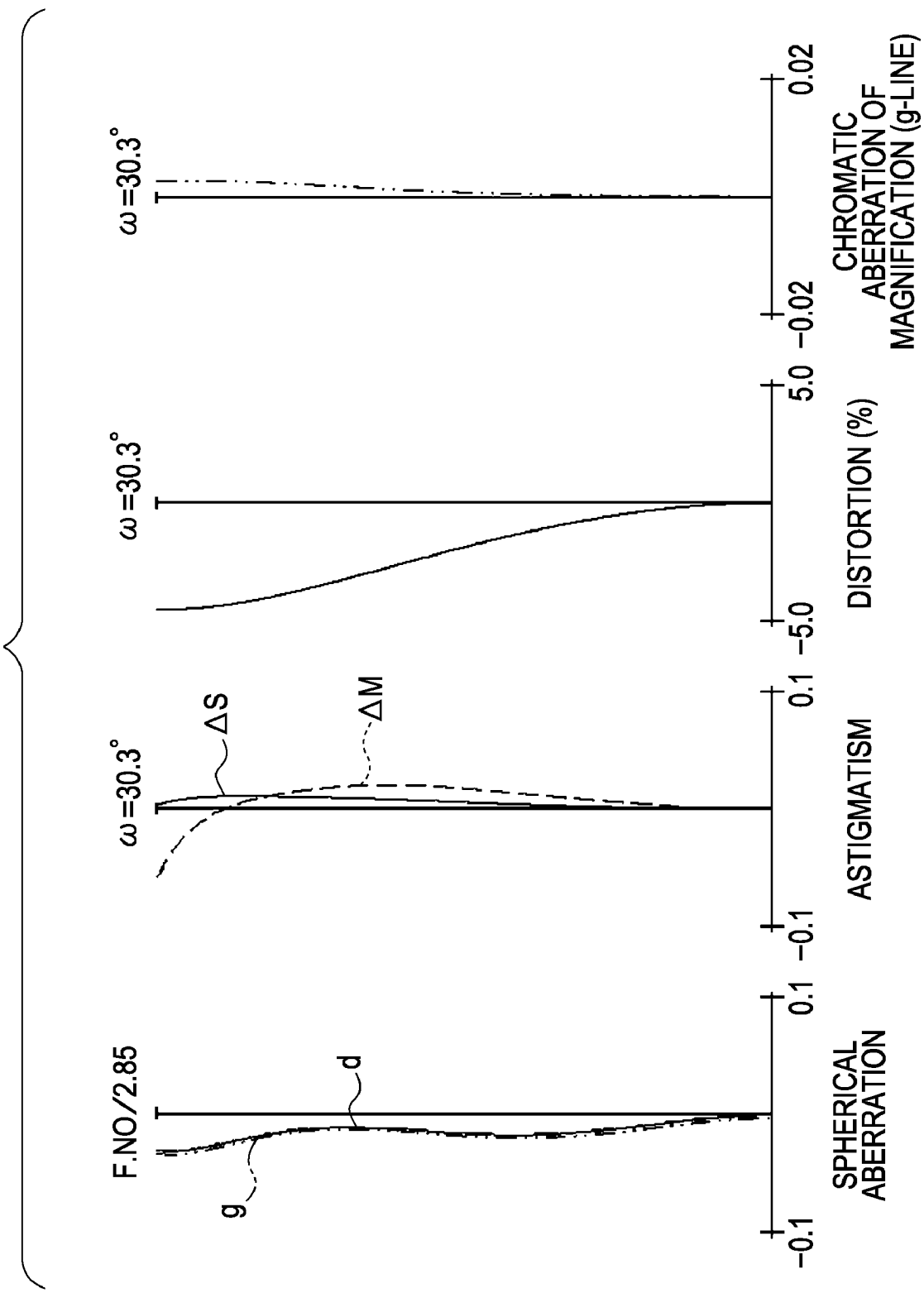
FIG. 2 is an aberration chart at the wide-angle end according to the first embodiment.
Figure 3:
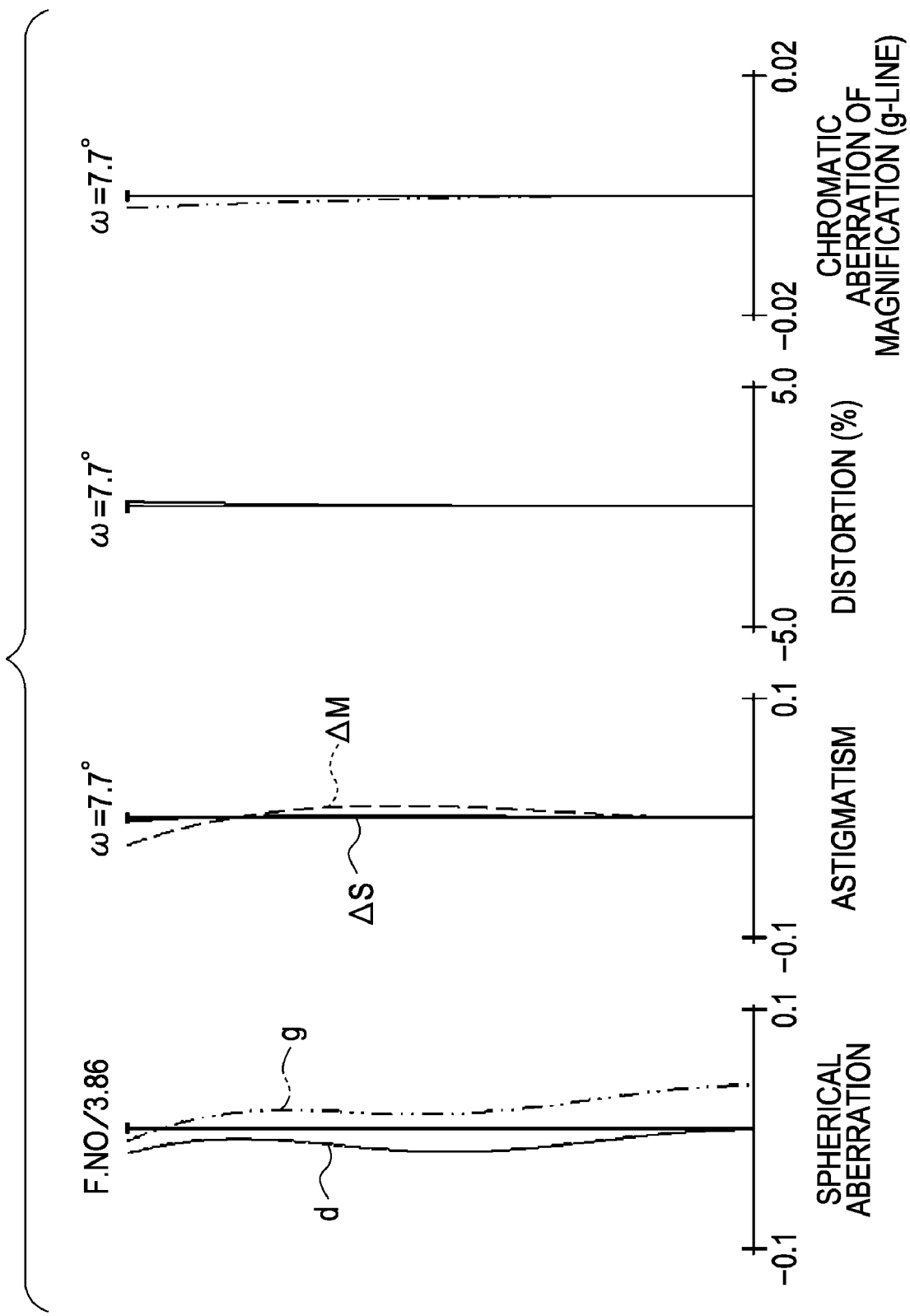
FIG. 3 is an aberration chart at the intermediate zoom position according to the first embodiment.
Figure 4:
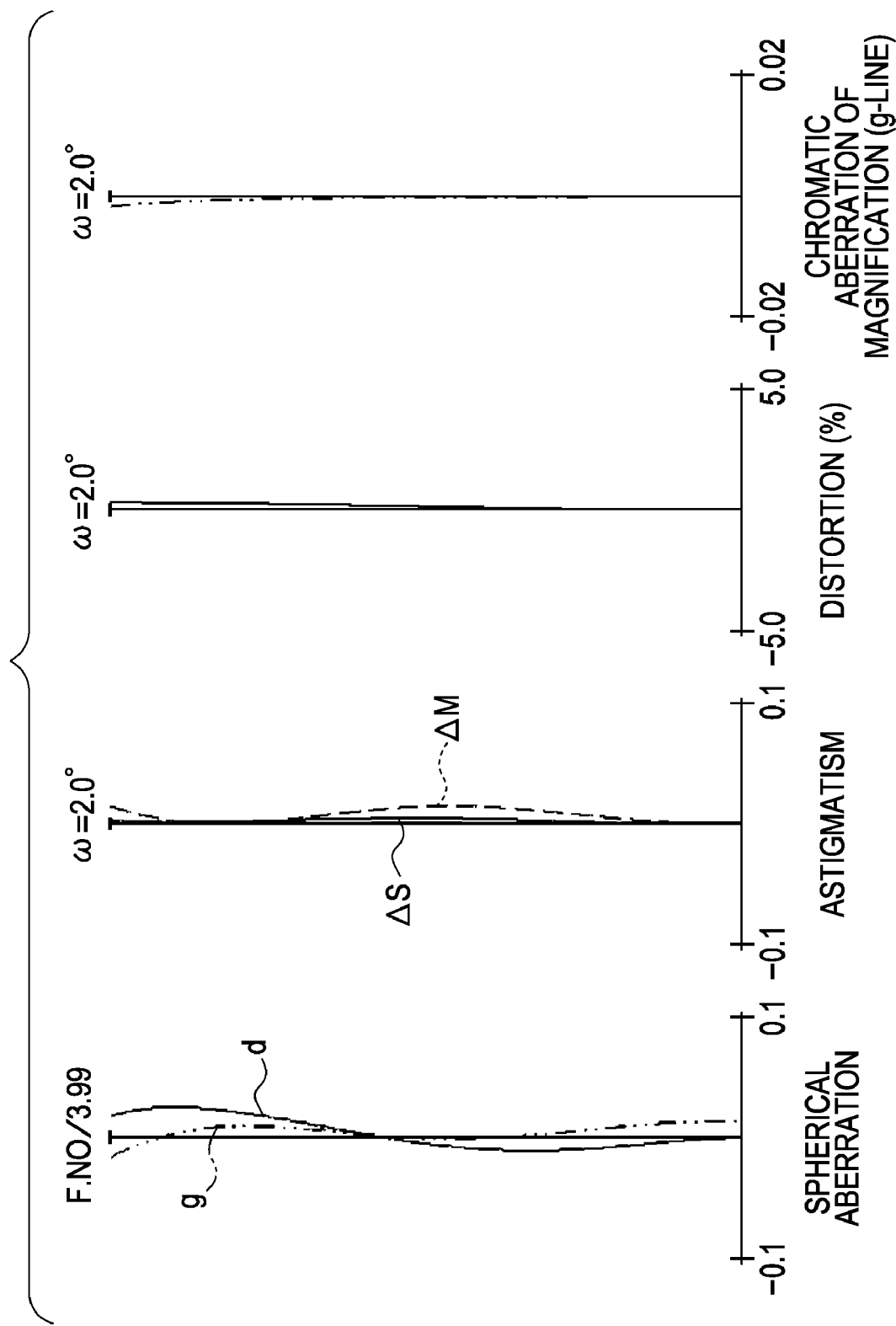
FIG. 4 is an aberration chart at the telephoto end according to a first numerical embodiment.

FIG. 1 is a lens cross-sectional view at the wide-angle end (short focal length end) of a zoom lens according to a first embodiment of the present invention. FIGS. 2, 3, and 4 are aberration charts at the wide-angle end, intermediate zoom position, and telephoto end of the zoom lens according to the first embodiment, respectively.

Figure 5:
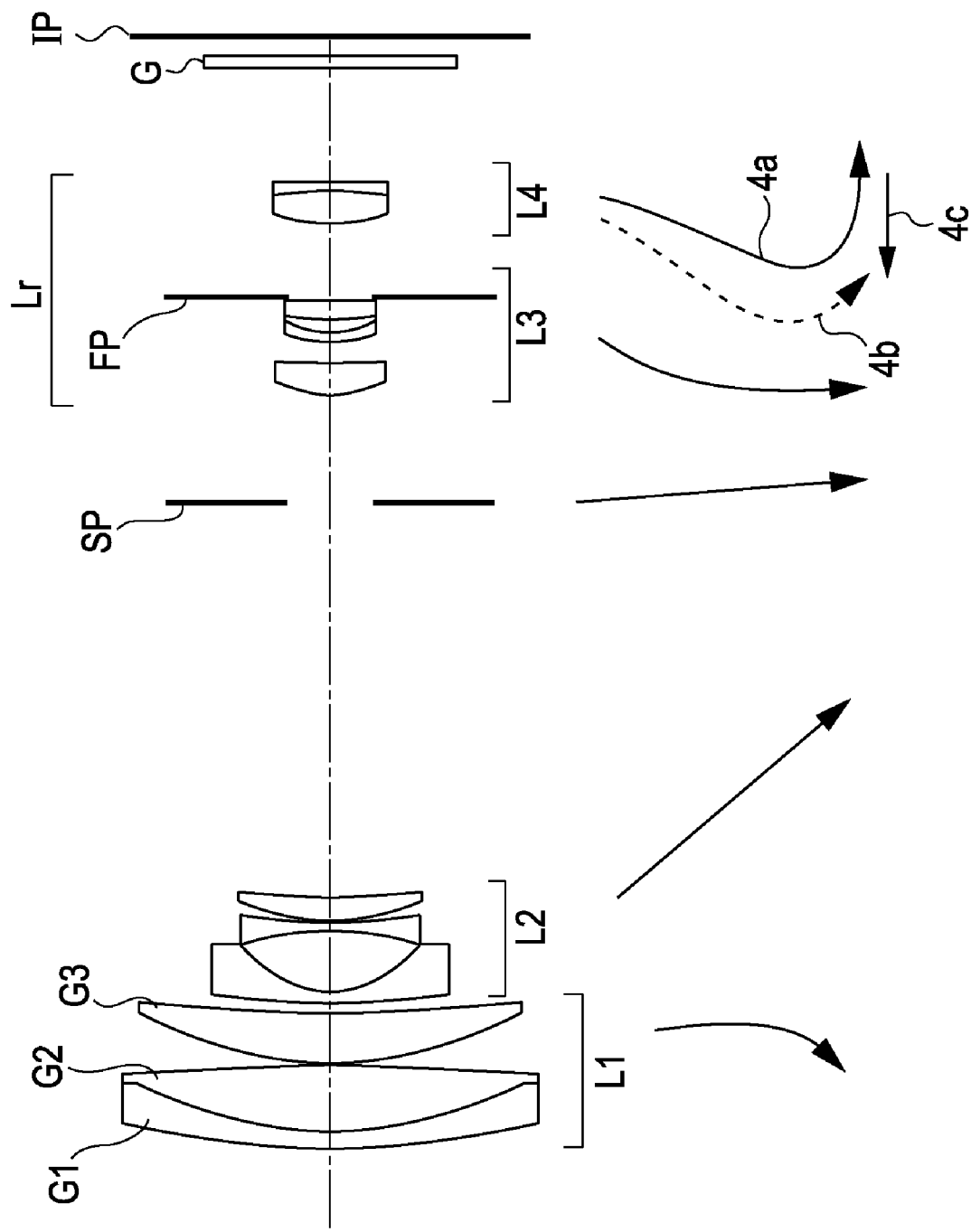
FIG. 5 is a lens cross-sectional view of a second numerical embodiment.
Figure 6:
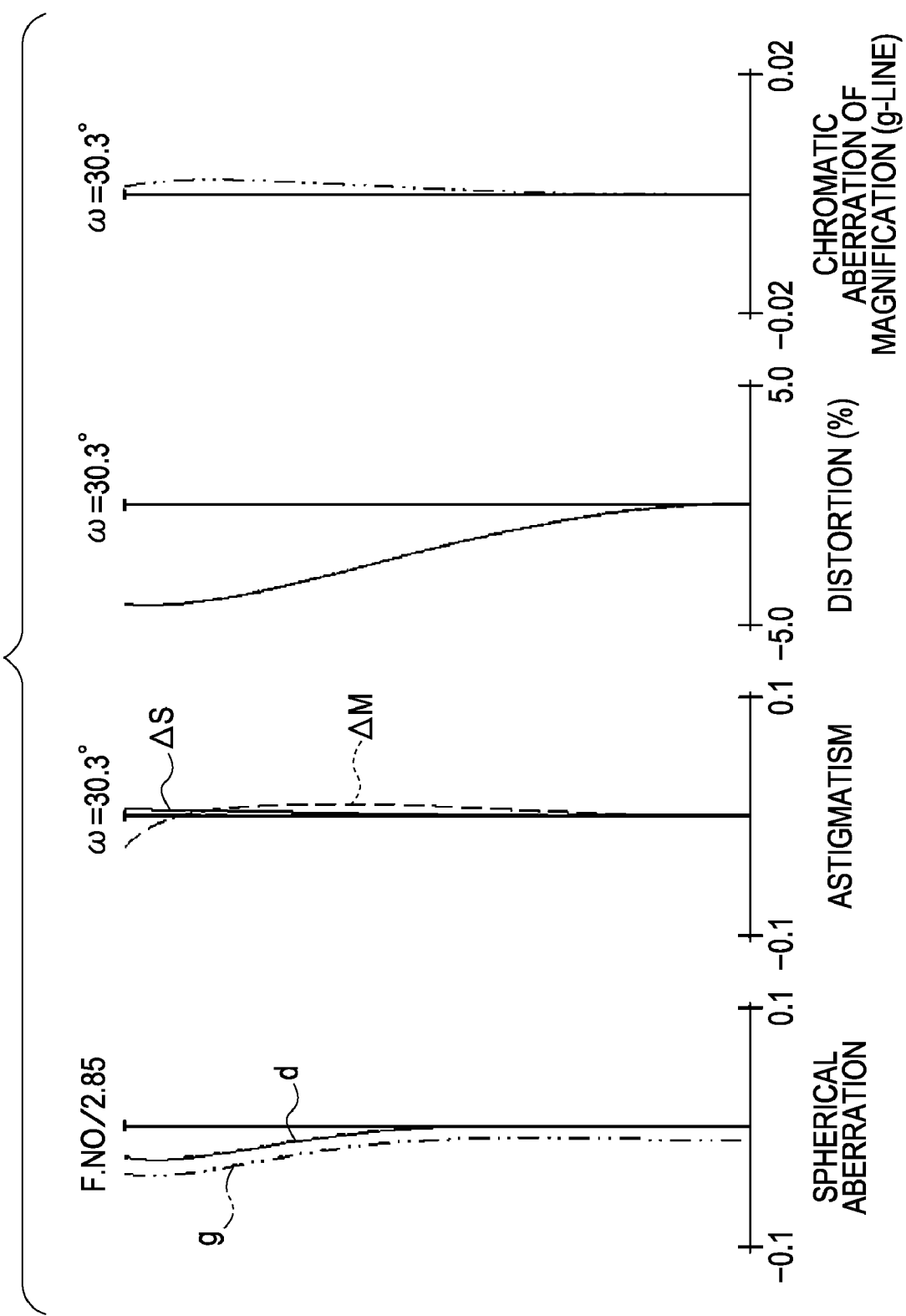
FIG. 6 is an aberration chart at the wide-angle end according to the second numerical embodiment.
Figure 7:
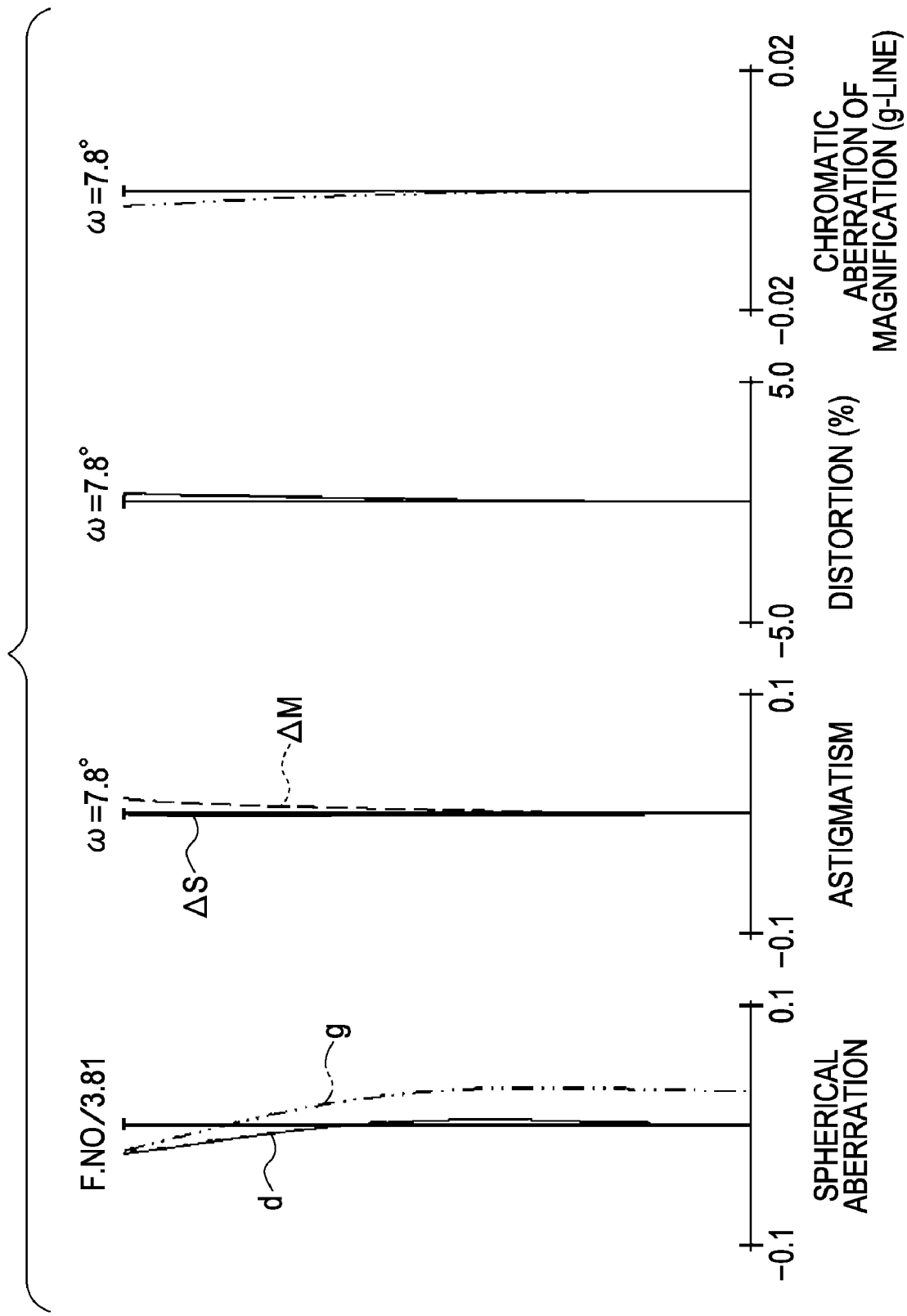
FIG. 7 is an aberration chart at the intermediate zoom position according to the second numerical embodiment.
Figure 8:
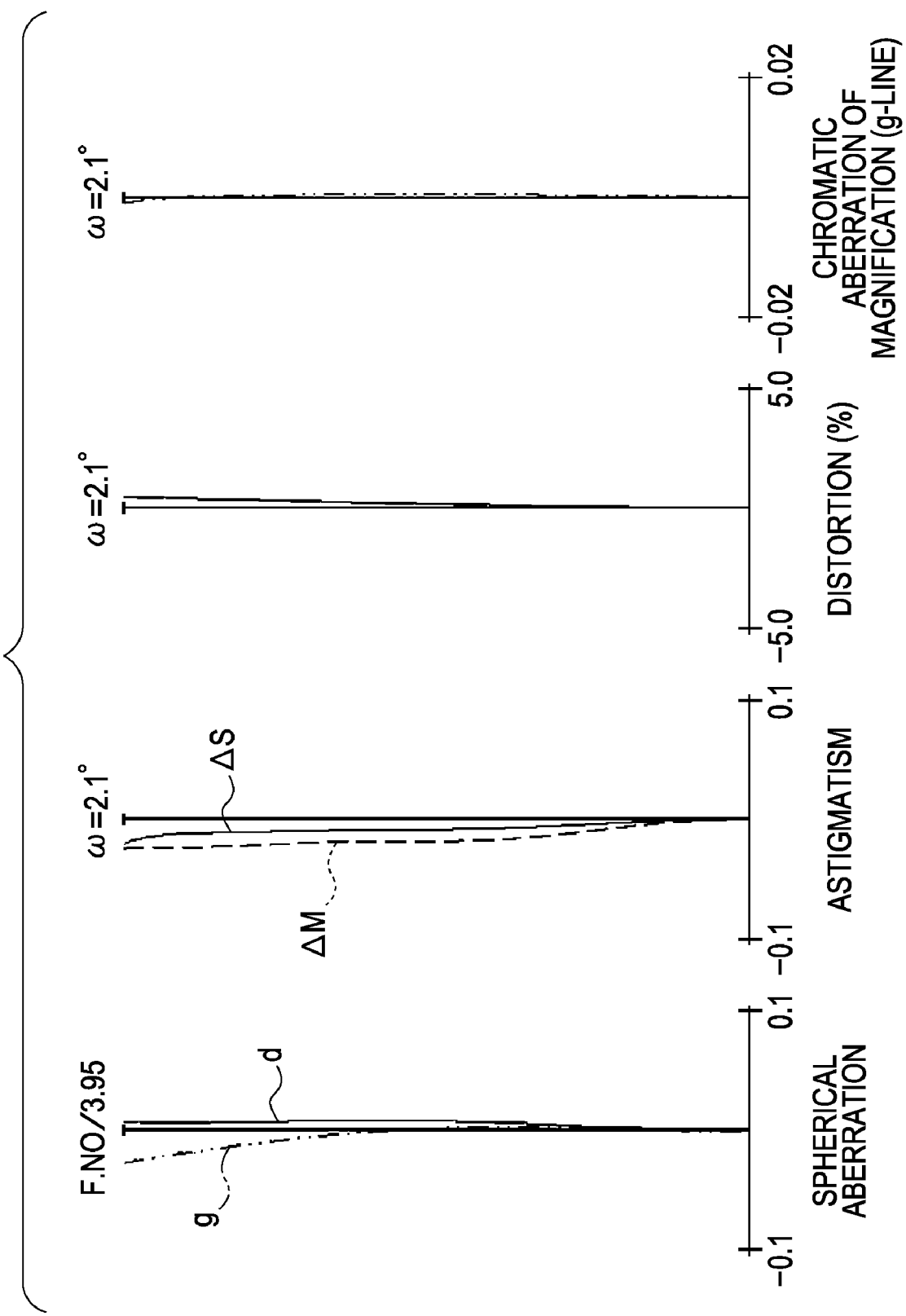
FIG. 8 is an aberration chart at the telephoto end according to the second numerical embodiment.

FIG. 5 is a lens cross-sectional view at the wide-angle end of a zoom lens according to a second embodiment of the present invention. FIGS. 6, 7, and 8 are aberration charts at the wide-angle end, intermediate zoom position, and telephoto end of the zoom lens according to the second embodiment, respectively.

Figure 9:
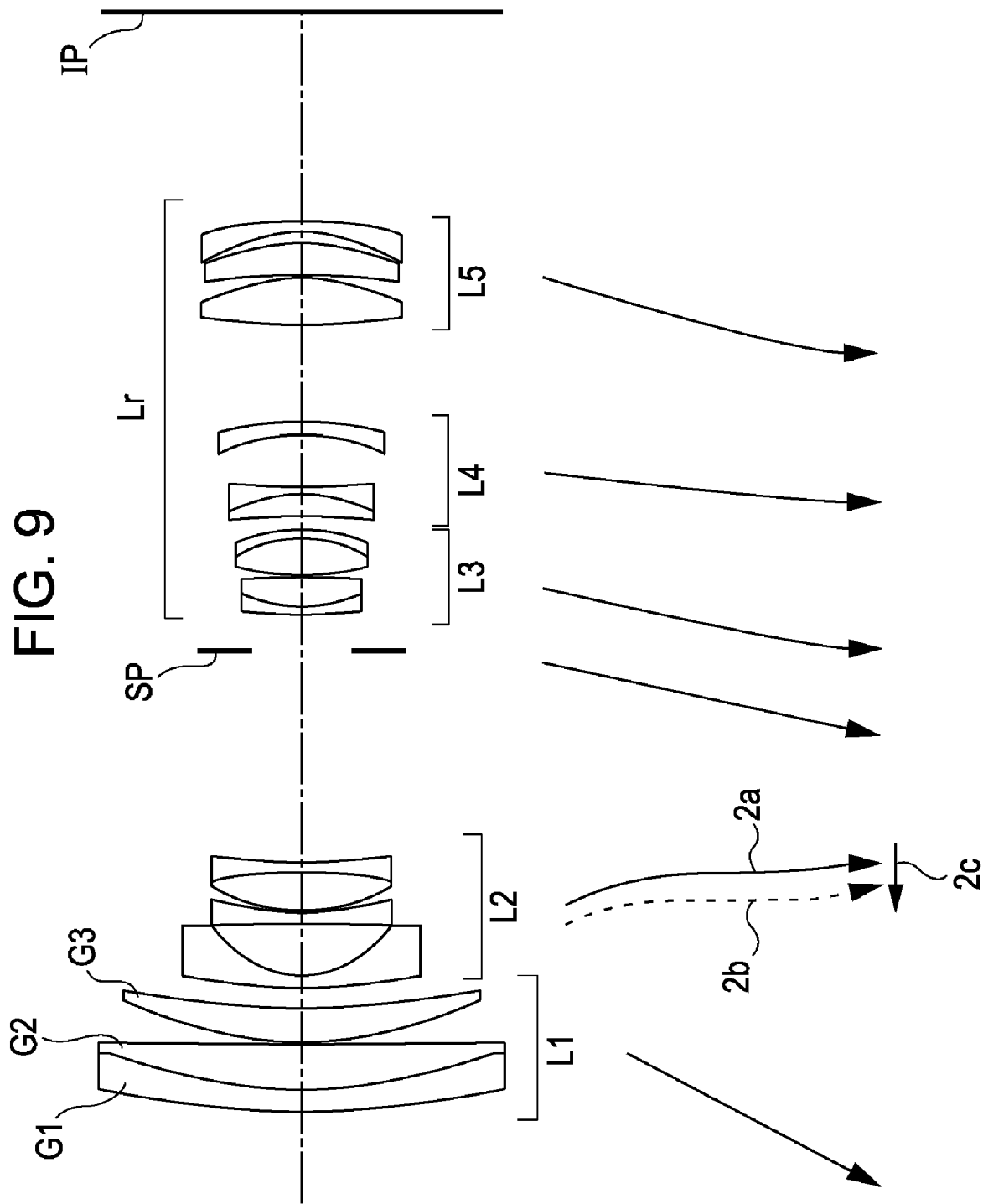
FIG. 9 is a lens cross-sectional view of a third numerical embodiment.
Figure 10:
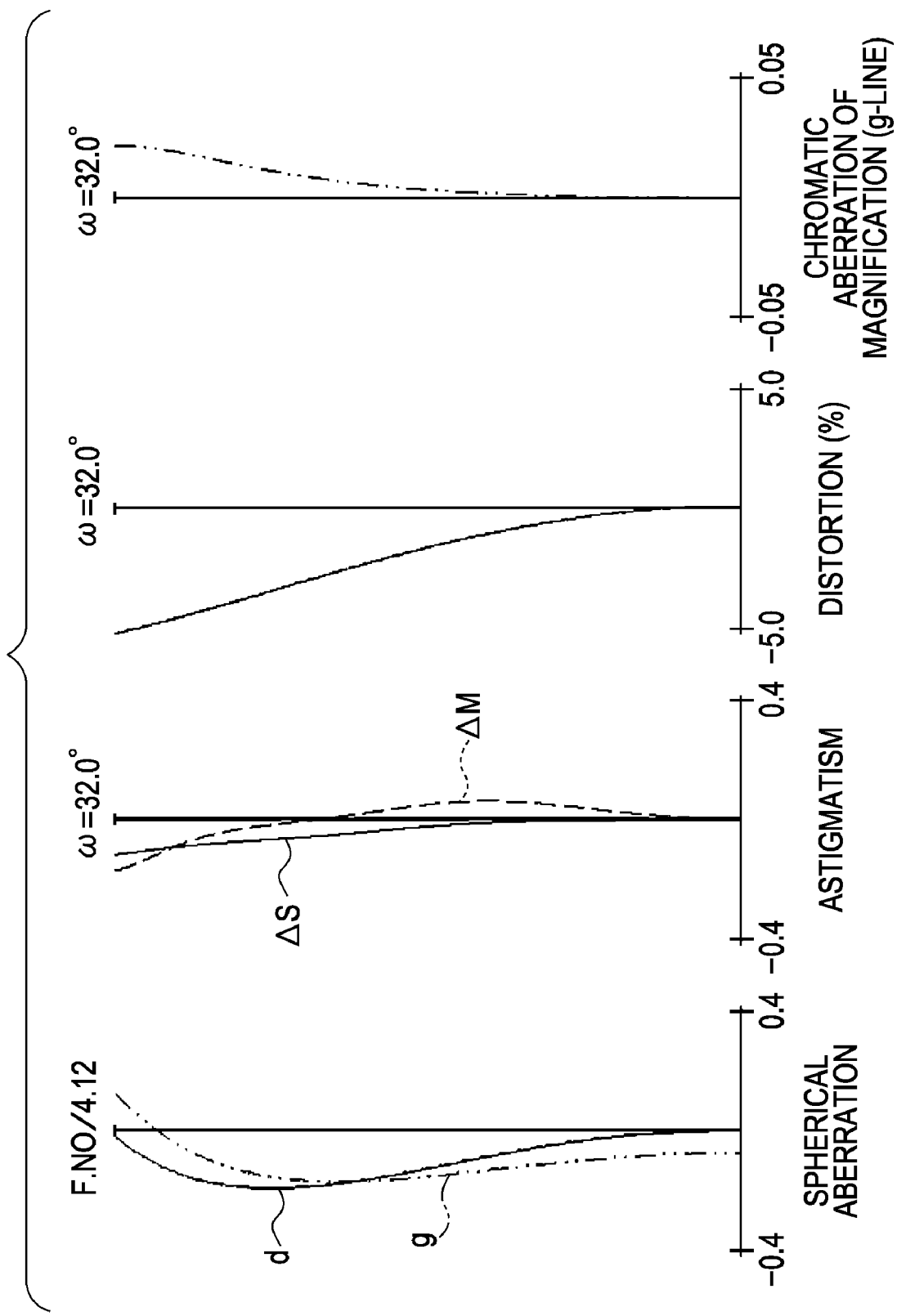
FIG. 10 is an aberration chart at the wide-angle end according to the third numerical embodiment.
Figure 11:
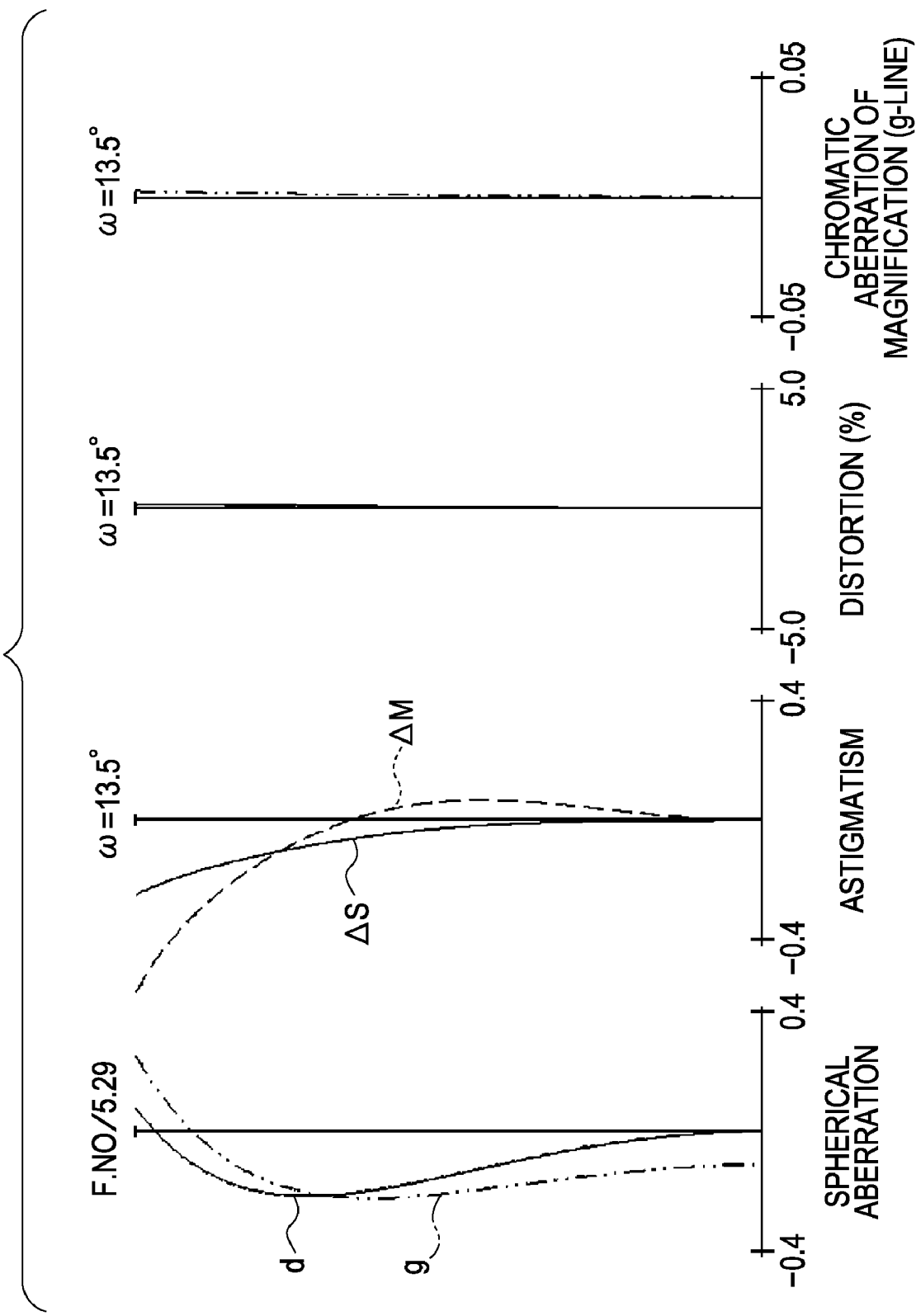
FIG. 11 is an aberration chart at the intermediate zoom position according to the third numerical embodiment.
Figure 12:
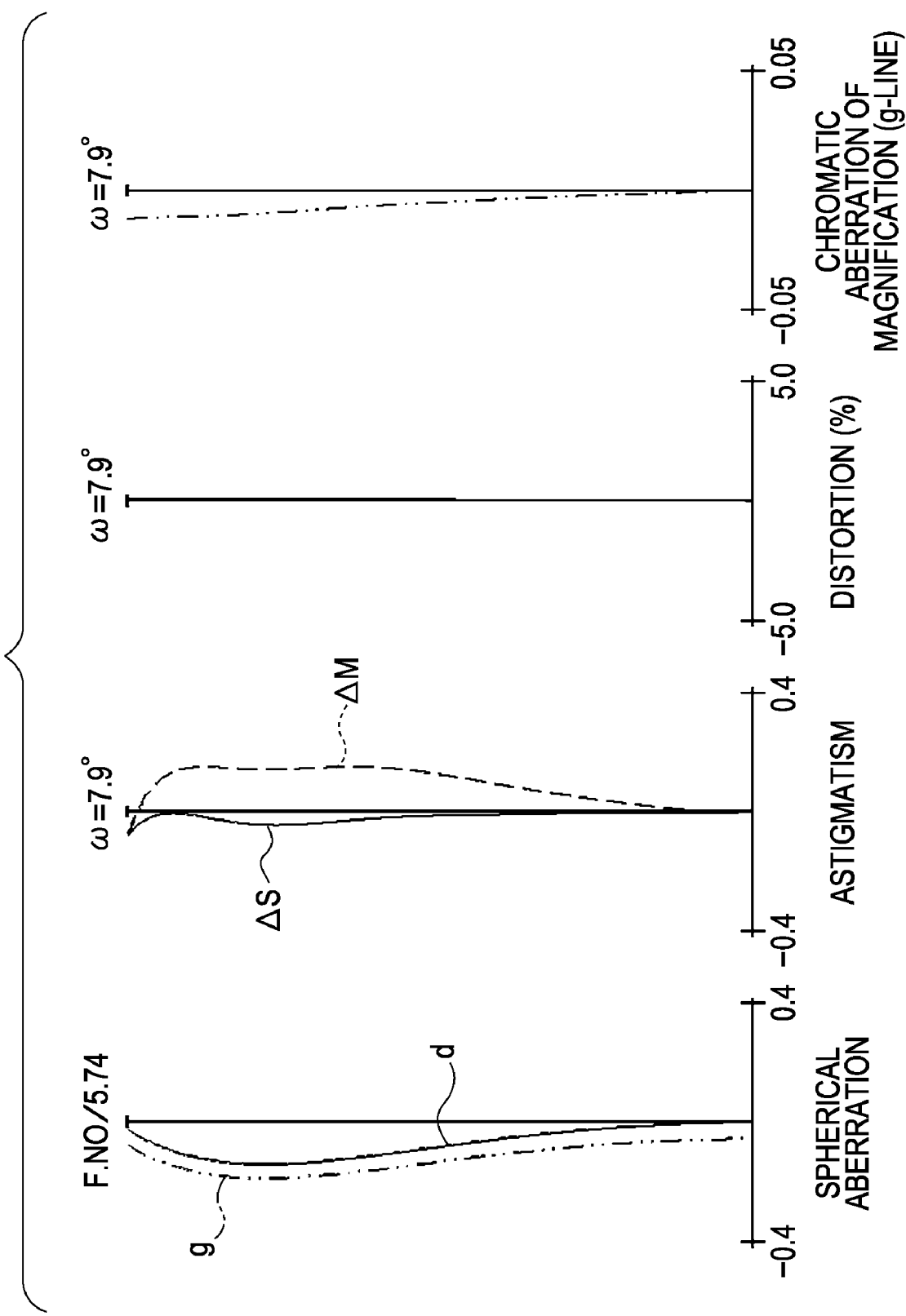
FIG. 12 is an aberration chart at the telephoto end according to the third numerical embodiment.

FIG. 9 is a lens cross-sectional view at the wide-angle end of a zoom lens according to a third embodiment of the present invention. FIGS. 10, 11, and 12 are aberration charts at the wide-angle end, intermediate zoom position, and telephoto end of the zoom lens according to the third embodiment, respectively.

Figure 16:
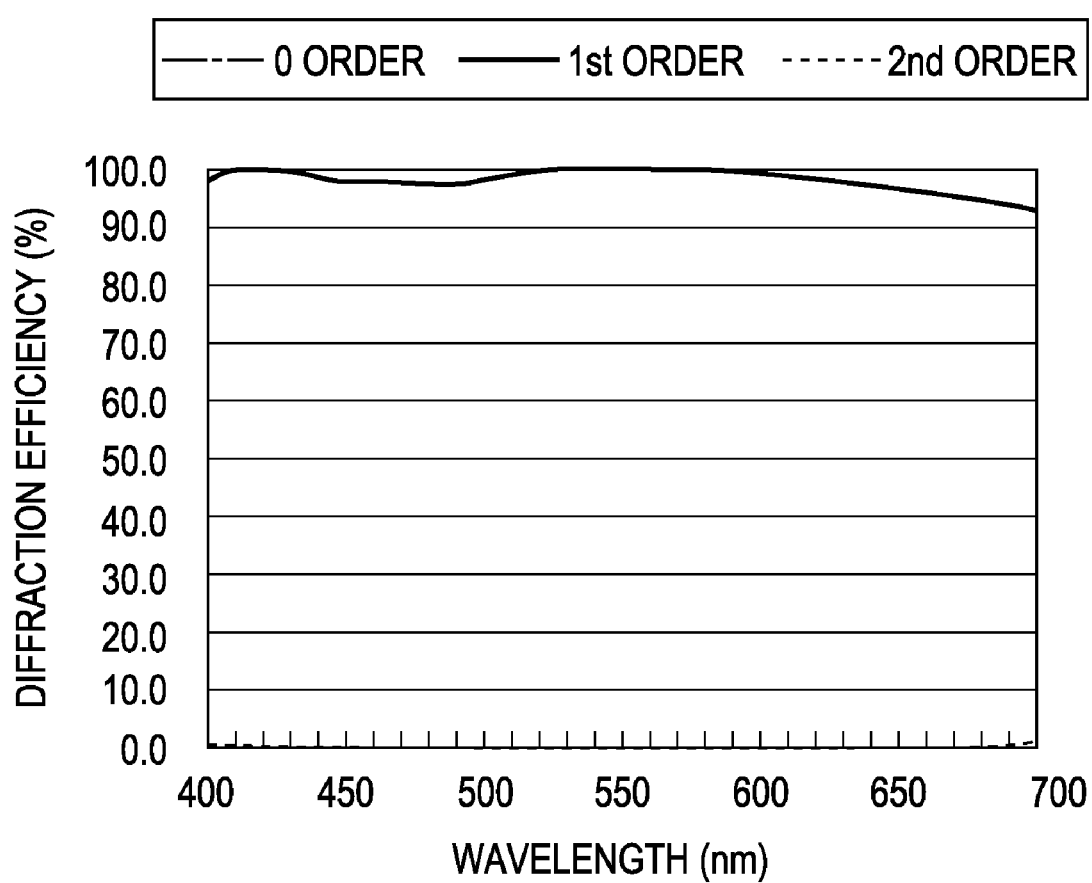
FIG. 16 is an explanatory diagram of the diffraction efficiency of the diffraction optical element having a layered configuration.
Figure 17:
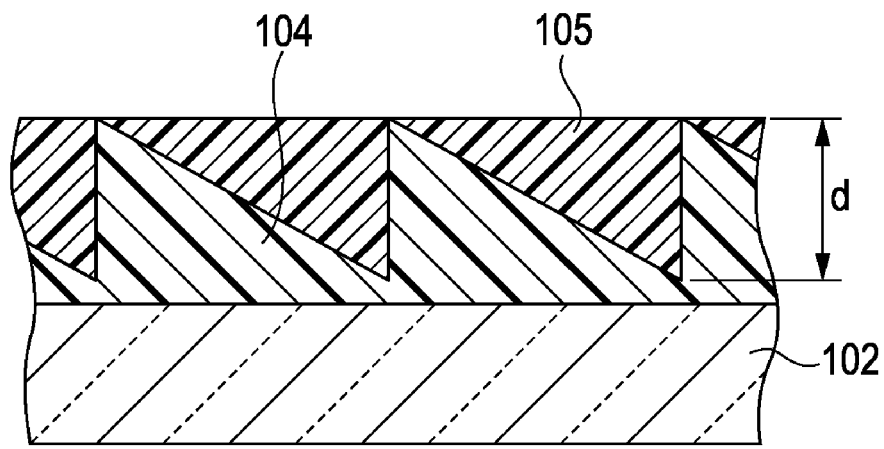
FIG. 17 is a cross-sectional view of a diffraction optical element having a layered configuration.
Figure 18:
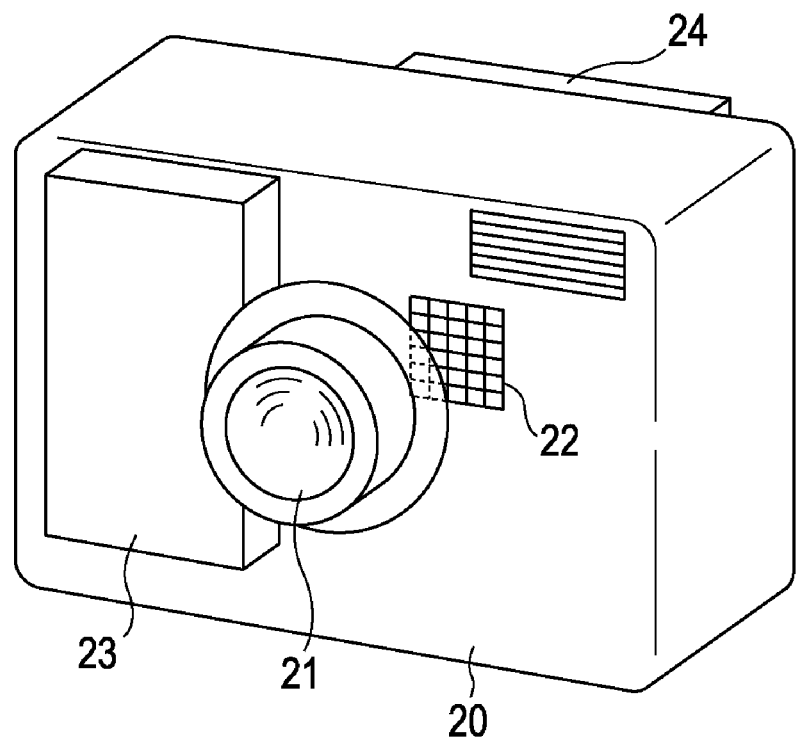
FIG. 18 is a principal-portion schematic diagram of an image pickup apparatus according to the present invention.
Figure 19:
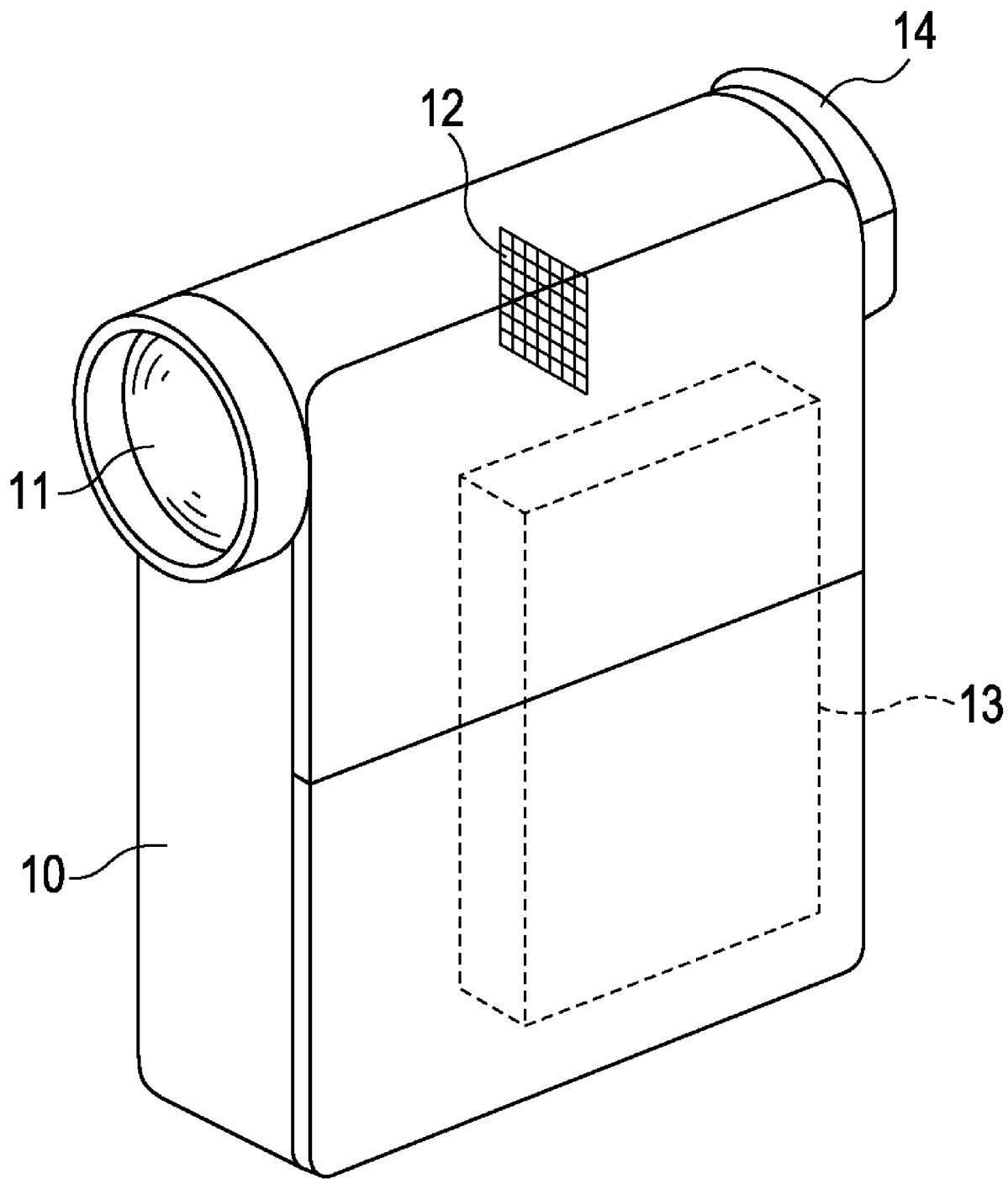
FIG. 19 is a principal-portion schematic diagram of an image pickup apparatus according to the present invention.

FIGS. 13 through 17 are each explanatory diagrams of a diffraction optical element according to the present invention. FIG. 18 is a schematic diagram of a digital camera (image pickup apparatus) including the zoom lens according to the pressing invention. FIG. 19 is a schematic diagram of a video camera including the zoom lens according to the present invention.

The zoom lens according to each embodiment is a imaging lens system employed for an image pickup apparatus, and in the lens cross-sectional views, the left side is the object side (forward) and the right side is the image side (back). Note that when employing the zoom lens according to each embodiment as a projector lens, such as a projector or the like, the left side is a screen, and the right side is a projected image.

In the lens cross-sectional views, Li is an i'th lens unit, which is the i'th counted from the object side. L1 is a first lens unit disposed closest to the object side. SP is an aperture disposed closer to the image side than the first lens unit L1. Lr is a rear lens group, which is disposed at the image side of the aperture SP, and including one or more lens units. FP is a flare-cut iris.

G is an optical block, which is equivalent to an optical filter, face plate, liquid crystal low-pass filter, infrared cut filter, or the like. IP is an image plane, which is equivalent to the image pickup face of a solid-state image pickup element (photoelectric conversion element) such as a CCD sensor, CMOS sensor, or the like at the time of being employed as an imaging optical system of a video camera or digital camera, and the photosensitive surface such as a film surface or the like at the time of being employed as a silver-salt film camera. Solid line arrows and dotted line arrows indicate the moving track of each lens unit at the time of zooming from the wide-angle end to the telephoto end.

In aberration charts, d and g denote a d-line and g-line, $\Delta M$ and $\Delta S$ denote a meridional image plane and sagittal image plane, and chromatic aberration of magnification is represented with a g-line.

Note that with the following respective embodiments, the wide-angle end and the telephoto end mean zoom positions where a lens unit for variable power is positioned at both ends in a movable range above an optical axis in the mechanism thereof.

With the respective embodiments, the first lens unit L1 includes at least one first diffraction optical part having positive power. Also, the rear lens group Lr includes at least one second diffraction optical part having positive power. Let us say that the focal length of the first diffraction optical part is fd1, and the focal length of the second diffraction optical part is fd2. Let us also say that the focal length of the entire system at the wide-angle and telephoto end are fw and ft respectively. At this time, the following conditional expressions are satisfied.

$$4.0 < fd1/fd2 < 15.0 \quad (1)$$

$$0.3 < L1/ft < 0.9 \quad (2)$$

$$1.5 < L2/fw < 7.0 \quad (3)$$

The diffraction optical parts are configured of diffraction gratings made up of an ultraviolet curable resin formed on a lens surface. The diffraction optical elements are configured of an optical member, such as a lens, plate, or the like, and a diffraction optical part formed the surface thereof.

Now, the refractive power φD of the diffraction optical parts (diffraction optical faces) is obtained as follows. Let us say that with the shape of the diffraction gratings of the diffraction optical part, a reference waveform (d-line) is λd, the distance from the optical axis is h, and the phase is φ(h).

The phase φ(h) is represented with an expression of φ(h)= $(2\pi/\lambda d) \cdot (C2 \times h^2 + C4 \times h^4 + \ldots + C2 \times i \cdot h^{2i})$. At this time, according to the coefficient C2 of the secondary term, the refractive power φD is as follows:

$$\phi D = -2 \cdot C2$$

Accordingly, the focal length fd of the diffraction optical part is as follows:

$$fd = \frac{1}{\phi d} = -\frac{1}{2 \cdot C2} \quad \text{[Expression 1]}$$

Next, description will be made regarding the technical meanings of the Conditional Expressions (1) through (3).

Upon the power of the second diffraction optical part becoming too weak, and consequently exceeding the lower limit of Conditional Expression (1), chromatic aberration of magnification exhibits shortage of correction at the wide-angle end, which is not desirable. Conversely, upon the power of the first diffraction optical part becoming too weak, and consequently exceeding the upper limit of Conditional Expression (1), the axial chromatic aberration and chromatic aberration of magnification exhibit shortage of correction at the telephoto end.

Upon the first diffraction optical part being provided at a position exceeding the lower limit of Conditional Expression (2), the height of off-axis light beam passing through the diffraction optical part is too low. Consequently, the correction of chromatic aberration of magnification becomes insufficient at the telephoto end. Conversely, upon exceeding the upper limit thereof, the entire lens length becomes long.

Upon the second diffraction optical part being provided at a position exceeding the lower limit of Conditional Expression (3), the height of off-axis light beam passing through the diffraction optical part is too low, and consequently, the correction of chromatic aberration of magnification becomes insufficient at the telephoto end. Conversely, upon exceeding the upper limit thereof, the entire lens length becomes long.

With the respective embodiments, not only multiple diffraction optical faces are simply provided, but also the power relation between the first diffraction optical part and the second diffraction optical part is set to the most appropriate range so as to satisfy Condition Expressions (1) through (3), and the positions thereof are stipulated. Thus, the correction of chromatic aberration is performed well at the telephoto end and wide-angle end.

Note that with the respective embodiments, one or more conditional expressions of the following conditional expressions is also satisfied. Note however, the following conditional expressions are further desirable conditions. That is to say, in order to solve various technical problems required for a zoom lens, the following condition expressions are additional requirements for the present embodiment.

Let us say that the focal length of the first lens unit L1 is f1. At this time, $$50.0 < fd1/ft < 500.0 \quad (4)$$

$$80.0 < fd2/fw < 500.0 \quad (5)$$

$$0.3 < f1/ft < 1.5 \quad (6)$$

Next, description will be made regarding the technical meanings of the Conditional Expressions (4) through (6).

Conditional Expression (4) is for correcting chromatic aberration at the telephoto end even further. Upon the power of the first diffraction optical part of the first lens unit L1 becoming too strong, and consequently exceeding the lower limit of Conditional Expression (4), anomalous dispersion effects become too great, and consequently, axial chromatic aberration exhibits over-correction at the telephoto end. Conversely, upon exceeding the upper limit thereof, the axial chromatic aberration exhibits shortage of correction at the telephoto end.

Conditional Expression (5) is for correcting chromatic aberration of magnification at the wide-angle end even further. Upon the power of the second diffraction optical part becoming too strong, and consequently exceeding the lower limit of Conditional Expression (5), the correction of the second spectrum components of chromatic aberration of magnification becomes difficult at the telephoto end. Conversely, upon the power becoming weak to exceed the upper limit, the correction of chromatic aberration of magnification becomes insufficient at the wide-angle end.

Conditional Expression (6) is a conditional expression to realize reduction in size of an optical system while correcting various aberrations such as a spherical aberration or coma aberration or the like over the entire zoom region. Upon the focal length of the first lens unit L1 becoming too short, and consequently exceeding the lower limit of Conditional Expression (6), the correction of spherical aberration or coma aberration becomes difficult at the telephoto end. Conversely, upon the focal length of the first lens unit L1 becoming too long, and consequently exceeding the upper limit thereof, the entire optical system is increased in size.

Note that with the respective embodiments, the numerical value ranges of the Conditional Expressions (1) through (6) can be set as follows:

$$6.0 < fd1/fd2 < 10.0 \quad (1a)$$

$$0.4 < L1/ft < 0.75 \quad (2a)$$

$$1.9 < L2/fw < 5.0 \quad (3a)$$

$$70.0 < fd1/ft < 400.0 \quad (4a)$$

$$120.0 < fd2/fw < 300.0 \quad (5a)$$

$$0.4 < f1/ft < 1.2 \quad (6a)$$

Note that the upper limits of the Conditional Expressions (1a) through (6a) may be set to the upper limits of the Conditional Expressions (1) through (6). Also, the lower limits of the Conditional Expressions (1a) through (6a) may be set to the lower limits of the Conditional Expressions (1) through (6). As described above, with the respective embodiments, a zoom lens having high optical performance with chromatic aberration being corrected over the entire zoom region is realized.

Next, description will be made regarding the configuration of a zoom lens according to each embodiment. With the zoom lens according to the first embodiment in FIG. 1, L1 is a first lens unit having positive refractive power, L2 is a second lens unit having negative refractive power, L3 is a third lens unit having positive refractive power, and L4 is a fourth lens unit having positive refractive power.

SP is an aperture, which is disposed forward of the third lens unit L3, that moves over the optical axis at the time of zooming. L4 is a fourth lens unit having positive refractive power. At the time of zooming, the respective lens units are moved.

With the present embodiment, a rear focus method is employed wherein the fourth lens unit L4 is moved over the optical axis to perform focusing.

The solid-line curve 4*a* and dotted-line curve 4*b* shown in this drawing, which relate to the fourth lens unit L4, illustrate moving tracks for correcting the fluctuation in the image plane occurring when performing zooming from the wide-angle end to the telephoto end when focusing on an infinite-distance object and a short-distance object, respectively.

With the present embodiment, the fourth lens unit L4 is moved to perform correction of the fluctuation in the image plane caused by change in magnification, and also the fourth lens unit L4 is moved to perform focusing.

In particular, as shown in the curves 4*a* and 4*b* of this drawing, the fourth lens unit L4 is moved so as to have a track protruding toward the object side at the time of zooming from the wide-angle end to the telephoto end. According to this, effective use of space between the third lens unit L3 and fourth lens unit L4 can be realized, and reduction in the entire lens length can be effectively realized.

Also, focusing is performed with the fourth lens unit having a relatively small effective diameter, whereby the load of an actuator can be reduced, and focusing can be performed at high speed.

Note that in the event that focusing from an infinite-distance object to a short-distance object is performed at the zoom position on the telephoto end, as shown in the arrow 4*c*, this is done by extending the fourth lens group L4 forward (object side).

At the time of focusing from an infinite-distance object to a short-distance object, at the telephoto end the first lens unit L1 is moved so as to be disposed closer to the object side as compared with the wide-angle end. At the telephoto end, the second lens unit L2 is moved so as to be disposed closer to the image plane side as compared with wide-angle end. At the telephoto end, the third lens unit L3 is moved so as to be disposed closer to the object side as compared with the wide-angle end.

With the present embodiment, the third lens unit L3 is moved so as to have a track protruding toward the object side. Thus, in the middle of zooming, front lens diameter can be readily reduced in size so as not to increase the front lens diameter in order to sufficiently secure a marginal ray.

With the first embodiment, the first lens unit L1 is made up of the following lens configuration. The closest to the object side is provided with a combined lens made up of a meniscus-shaped negative (negative refractive power) lens G1 and a positive (positive refractive power) lens G2 with the convex surface directed to the object side.

Further, the image side thereof is disposed with a meniscus-shaped positive lens G3 of which the absolute value of the refractive power is strong as to the object side as compared with the image side, and also of which the convex surface is the object side, and a meniscus-shaped positive lens G4 of which the absolute value of the refractive power is strong as to the object side as compared with the image side, and also of which the convex surface is the object side.

The combined surface between the lens G1 and lens G2 is provided with a first diffraction optical part configured of diffraction grating having positive power with rotation symmetry as to the optical axis, which makes up a diffraction optical element along with the combined lens. The curvature of the combined surface where this diffraction optical part is provided is appropriately set, whereby the angle of the incident light beam as to the diffraction optical part (diffraction optical surface) of the light beam based on each field angle is set so as to be within a suitable range. Thus, high diffraction efficiency is maintained over the entire zoom range and all field angles.

Note that with the respective embodiments, the diffraction optical part (diffraction optical surface) means one or more diffraction gratings provided on a substrate (flat plate or lens). Also, the diffraction optical element means an element wherein the diffraction optical part made up of one or more diffraction gratings is provided on a substrate (flat plate or lens).

The second lens unit L2 is configured of, in order from the object side to the image side, a meniscus-shaped negative lens with the concave surface directed to the image side, a both-concave-shaped negative lens, and a positive lens. Thus, the fluctuation in aberrations caused by zooming is corrected well.

The third lens unit L3 is configured of a positive lens with the convex surface directed to the object side, a meniscus-shaped negative lens with the convex surface directed to the object side, and a positive lens with the convex surface directed to the object side.

The object-side surface of the positive lens at the object side has an aspherical shape. Employing this aspherical shape enables a spherical aberration over the optical axis at the wide-angle to be corrected even further. Also, as for the aspherical shape at this time, a shape such that positive refractive power becomes weak as the position of the lens closes to the periphery from the center thereof can be employed.

The fourth lens unit L4 is configured of a combined lens between a both-convex-shaped positive lens and a negative lens. The combined surface thereof is provided with a second diffraction optical part configured of diffraction gratings having positive power with rotation symmetry as to the optical axis. Thus, the fluctuation in chromatic aberrations at the time of focusing with the fourth lens unit L4 is reduced.

Also, with a high zoom ratio (zoom ratio of 10 or more), when attempting to correct chromatic aberration on the telephoto end by generating anomalous dispersion at the diffraction optical part provided in the first lens unit L1, chromatic aberration of magnification frequently occurs at the wide-angle end.

Accordingly, with the present embodiment, the second diffraction optical part having positive power is provided in the fourth lens unit L4 disposed around the image plane, thereby correcting the secondary spectrum of chromatic aberration of magnification at the wide-angle end well.

Second Embodiment

Next, description will be made regarding a zoom lens according to a second embodiment shown in FIG. 5. The zoom lens according to the second embodiment is the same zoom type as the zoom lens according to the first embodiment shown in FIG. 1. Also, the position where the diffraction optical part within the first lens unit L1 is provided is also the same position as the position in the first embodiment.

The number of lenses making up the first lens unit L1 according to the second embodiment differs from that in the first embodiment, but the lens configurations of the second, third, and fourth lens units according to the second embodiment are the same as those in the first embodiment.

With the second embodiment, the first lens unit L1 is configured of a cemented lens between a meniscus-shaped negative lens G1 of which the convex surface is directed to the object side and a positive lens G2, and a meniscus-shaped positive lens G3 of which the convex surface is directed to the object side.

Also, the cemented surface between the negative lens G1 and positive lens G2 is provided with a diffraction optical part having positive power.

With the present embodiment, the correction effects of chromatic aberration of the diffraction optical part reduce chromatic aberrations generated at the first lens unit L1, and facilitate aberration correction and reduction in the entire system size.

Heretofore, when attempting to realize reduction in the entire system size only with a selection of a lens material, a lens material with great anomalous dispersion is employed for the positive lens within the first lens unit L1, and accordingly, the refractive index of the material of the positive lens becomes low. As a result thereof, attempting to configure the first lens unit L1 with one negative lens and two positive lenses makes it difficult to correct spherical aberration or coma aberration.

With the present embodiment, providing the diffraction optical part in the first lens unit L1 to provide anomalous dispersion effects increases the flexibility of the positive lenses, and facilitates the correction effects of chromatic aberration and reduction in the number of lenses.

Third Embodiment

Next, description will be made regarding a zoom lens according to a third embodiment shown in FIG. 9. With the zoom lens according to the third embodiment shown in FIG. 9, L1 denotes a first lens unit having positive refractive power, L2 denotes a second lens unit having negative refractive power, L3 denotes a third lens unit having positive refractive power, L4 denotes a fourth lens unit having negative refractive power, and L5 denotes a fifth lens unit having positive refractive power. The respective lenses are moved at the time of zooming.

SP denotes an aperture, which is disposed forward of the third lens unit L3, that is moved over the optical axis at the time of zooming. The aperture SP may be moved independently or may be moved integral with the third lens unit L3. At the time of zooming from the wide-angle end to the telephoto end, the first lens unit, the third lens unit, the fourth lens unit, and the fifth lens unit are moved to the object side, and the second lens unit L2 is moved in a nonlinear manner. Setting the moving track and refractive power of each moving lens unit appropriately facilitates reduction in the entire lens system size. Focusing is performed by moving the second lens unit L2 over the optical axis.

The solid-line curve 2a and dotted-line curve 2b, which relate to the second lens unit L2, are moving tracks for correcting the fluctuation in the image plane caused by zooming to the zoom position from the wide-angle end to the telephoto end when focusing on an infinite-distance object and a short-distance object, respectively.

With the present embodiment, for example, focusing from an infinite-distance object to a short-distance object is performed on the telephoto end by extending the second lens unit L2 forward, as shown in the straight line 2c in this drawing.

With the third embodiment, the first lens unit L1 is configured of the following lens configuration.

The first lens unit L1 is configured of, in order from the object side to the image side, a negative lens G1, a positive lens G2, and a positive lens G3.

The cemented surface between the negative lens G1 and positive lens G2 is provided with a first diffraction optical part having positive power. Employing this diffraction optical part facilitates correction of an axial aberration and chromatic aberration of magnification at the telephoto end to be performed well.

The second lens unit L2 is configured of a negative lens wherein with the absolute value of refractive power at the object-side surface is greater than that at the image-side surface, a both-concave-shaped negative lens, a both-convex-shaped positive lens, and a both-concave-shaped negative lens.

The third lens unit L3 is configured of a combined lens between a negative lens and a positive lens, and a combined lens between a positive lens and a negative lens.

The fourth lens unit L4 is configured of a combined lens between a positive lens and a negative lens, and a negative lens of which the object-side surface has a concave shape.

The fifth lens unit L5 is configured of a both-convex-shaped positive lens, a positive lens of which the convex surface is directed to the image side, and a meniscus-shaped negative lens of which the image side has a convex surface.

The image-side surface of the second positive lens from the object side is provided with a second diffraction optical part having positive refractive power with rotation symmetry as to the optical axis.

The second diffraction optical part having positive power is provided in the fifth lens unit L5, thereby correcting chromatic aberration of magnification at the wide-angle end effectively.

Also, with the present embodiment, at the time of zooming from the wide-angle end to the telephoto end, the first lens unit L1 including the first diffraction optical part is moved toward the object side considerably, whereby the height of off-axis light beam is reduced at the wide-angle end and is increased at the telephoto end.

According to this arrangement, while correcting chromatic aberration of magnification at the telephoto end effectively, influence of the aberration at the wide-angle end can be reduced.

Also, the fifth lens unit L5 is moved such that the off-axis light beam of the fifth lens unit L5 including the second diffraction optical part becomes high at the wide-angle end and becomes low at the telephoto end. Thus, influence on chromatic aberration by the second diffraction optical part can be increased at the wide-angle end and can be reduced at the telephoto end.

In order to suppress the fluctuation in aspherical aberrations at the time of zooming, the fifth lens unit L5 can be configured so as to have at least two positive lenses and one negative lens.

Note that with the above-mentioned respective embodiments, a lens unit having small refractive power may be added to the image side of the first lens unit L1, fourth lens unit L4, or fifth lens unit L5. Also, a teleconverter lens, wide converter lens, or the like may be disposed at the object side or image side.

As described above, with the respective embodiments, a zoom lens is obtained wherein chromatic aberration is corrected well over the entire zoom region from the wide-angle end to the telephoto end using two diffraction optical parts.

Figure 13:
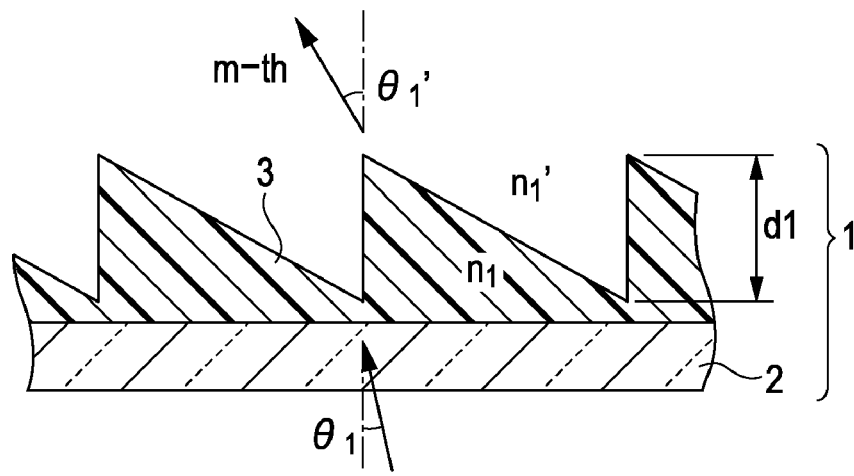
FIG. 13 is a cross-sectional view of a diffraction optical element having a single-layer configuration.

Now, description will be made regarding the configuration of the diffraction optical element employed for the zoom lens according to the first embodiment. FIG. 13 is a partial enlarged cross-sectional view of the diffraction optical part of a diffraction optical element 1, where diffraction gratings 3 made up of one layer are provided onto a substrate (transparent substrate) 2 making up a lens.

Figure 14:
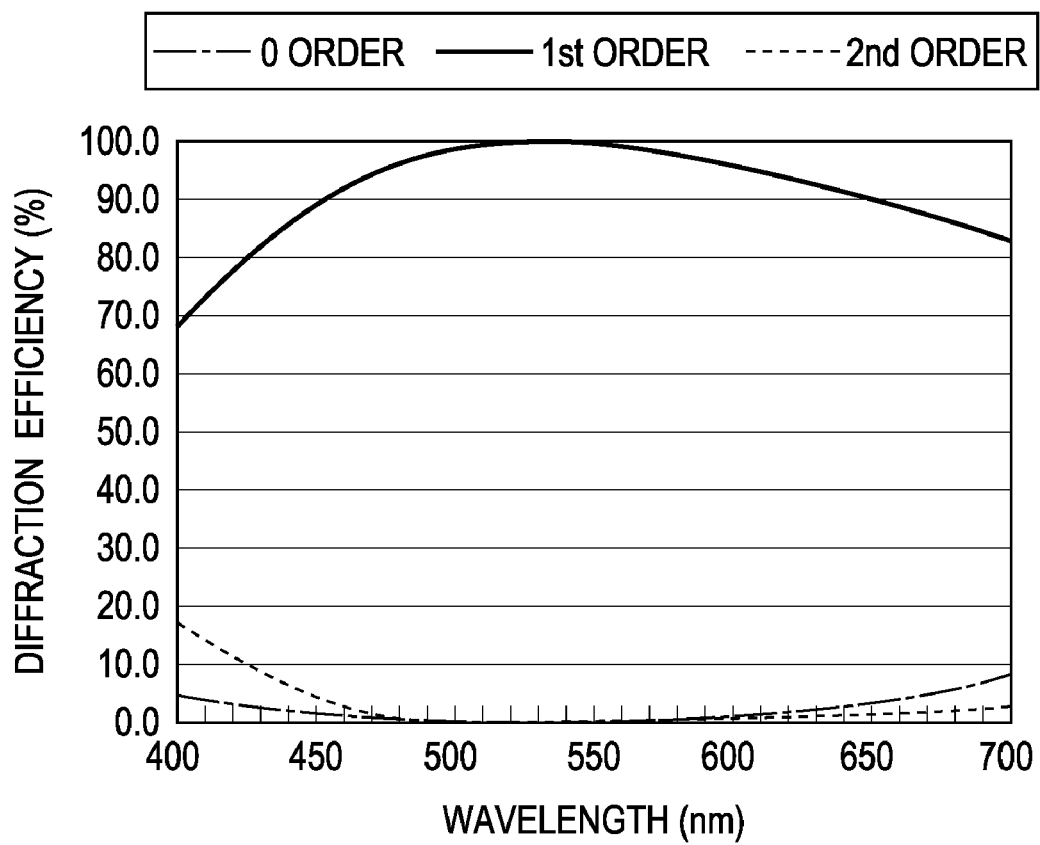
FIG. 14 is an explanatory diagram of the diffraction efficiency of the diffraction optical element having a single-layer configuration.

FIG. 14 is a diagram illustrating the diffraction efficiency property of the diffraction optical element 1. In FIG. 14, the horizontal axis represents wavelengths, and the vertical axis represents diffraction efficiency.

Note that diffraction efficiency is the rate of the light quantity of diffracted light as to the whole transmitted light fluxes. Reflected light at the grating border plane or the like complicates description, and accordingly will not be taken into consideration here.

The optical material of the diffraction grating 3 is configured such that an ultraviolet curing resin (refractive index nd=1.513, Abbe number vd=51.0) is employed, the grating thickness d1 is set to 0.3 μm, and the diffraction efficiency of +1st order becomes the peak at a wavelength of 530 nm. That is to say, the design order is +1st order, and the design wavelength is a wavelength of 530 nm. In FIG. 14, the diffraction efficiency of the +1st order diffracted light is illustrated with a solid line.

Further, in FIG. 14, the diffraction efficiency of the diffraction order (0 order and +2nd order which are +1st order ±1 order) near the design order is also described. As can be understood from the drawing, the diffraction efficiency at the design order exhibits its peak at around the design wavelength, and gradually decreases at wavelengths other than that.

This lowering quantity of the diffraction efficiency at the design order results in diffracted light at another order, and becomes a cause of flaring. Also, in the event that the diffraction optical element is used at multiple portions within the optical system, the lowering at a wavelength other than the design wavelength leads to the lowering of transmittances.

Figure 15:
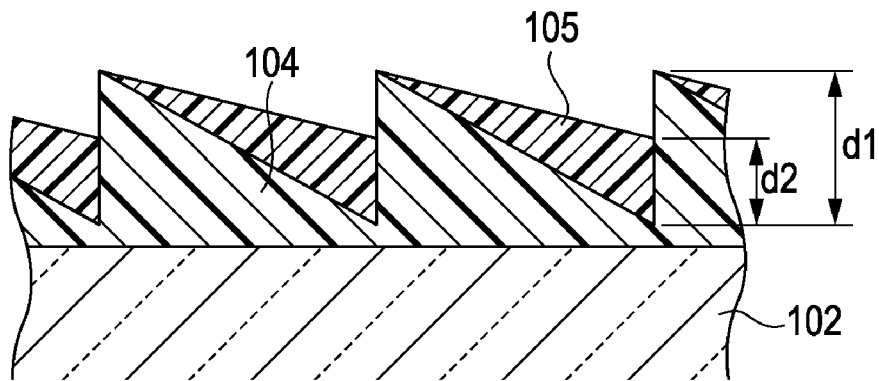
FIG. 15 is a cross-sectional view of a diffraction optical element having a layered configuration.

Next, description will be made regarding a layered diffraction optical element wherein multiple diffraction gratings made up of a different material are layered. FIG. 15 is a partial enlarged cross-sectional view of a layered diffraction element, and FIG. 16 is a diagram representing the wavelength dependency of the diffraction efficiency of the +1st order diffracted light of the diffraction optical element shown in FIG. 15.

With the diffraction optical element shown in FIG. 15, a first diffraction grating 104 made up of an ultraviolet curing resin (refractive index nd=1.499, Abbe number vd=54) is formed on the substrate 102.

A second diffraction grating 105 (refractive index nd=1.598, Abbe number vd=28) is further formed thereupon. Let us say that with this combination of materials, the grating thickness d1 of the first diffraction grating 104 is set to 13.8 μm, and the grating thickness d2 of the second diffraction grating 105 is set to 10.5 μm.

As can be understood from FIG. 16, the diffraction optical element including the diffraction gratings having a layered configuration is employed, whereby with the diffracted light of the design order, high diffraction efficiency is obtained, such as 95% or more at the whole used wavelength regions (visible region, here).

Note that as for the above-mentioned diffraction optical element having a layered configuration, the material making up the diffraction gratings is not restricted to an ultraviolet curing resin, and rather another plastic material or the like can be employed, a first layer may be directly formed on the substrate depending on the substrate. Also, there is no need to necessarily change the thickness of each grating. The thickness of the layer 104 and that of the layer 105 may be the same as shown in FIG. 17 depending on the combination of materials. In this case, a grating shape is not formed on the surface, and accordingly dust-proofness is good. So the assembling workability of the diffraction optical element can be improved. Moreover, there is no need to necessarily contact between the diffraction gratings 104 to the diffraction gratings 105 tightly, and rather the layers of the two diffraction gratings may disposed across an air layer.

The diffraction optical element has great anomalous dispersion, so the diffraction optical face is thus provided in the first lens unit L1, whereby correction of an axial chromatic aberration and chromatic aberration of magnification at the telephoto end side can be performed effectively.

Next, description will be made regarding an embodiment of a digital camera (image pickup apparatus) employing the zoom lens according to the present invention as a photographic optical system with reference to FIG. 18.

In FIG. 18, reference numeral 20 denotes a digital camera main body. Reference numeral 21 denotes a photographic optical system configured of the zoom lens according to the present invention, numeral 22 denotes a solid-state image pickup element (photoelectric conversion element) such as CCD or the like for photo-receiving a subject image using the photographic optical system 21, numeral 23 denotes memory for recording information corresponding to the subject image photo-received by the image pickup element 22, and numeral 24 denotes a finder for observing a subject image displayed on a display element not shown in the drawing.

The above-mentioned display element is configured of a liquid crystal panel or the like, where a subject image formed on the image pickup element 22 is displayed. Thus, the zoom lens according to the present invention is applied to an image pickup apparatus such as a digital camera or the like, thereby realizing an image pickup apparatus which is small, but has high optical performance.

Next, description will be made regarding an embodiment of a video camera (image pickup apparatus) employing the zoom lens according to the present invention as a photographic optical system with reference to FIG. 19.

In FIG. 19, reference numeral 10 denotes a video camera main body. Reference numeral 11 denotes a photographic optical system configured of the zoom lens according to the present invention, numeral 12 denotes a solid-state image pickup element such as CCD or the like for photo-receiving a subject image using the photographic optical system 11, numeral 13 denotes memory for recording information corresponding to the subject image photo-received by the image pickup element 12, and numeral 14 denotes a finder for observing a subject image displayed on a display element not shown in the drawing.

The above-mentioned display element is configured of a liquid crystal panel or the like, where a subject image formed on the image pickup element 12 is displayed. Thus, the zoom lens according to the present invention is applied to an image pickup apparatus such as a video camera or the like, thereby realizing an image pickup apparatus which is small, but has high optical performance. The present invention can be applied to a single-lens reflex camera in the same way.

Next, numerical embodiments of the present invention will be shown. With numerical embodiments, i denotes the face order from the object side. Ri denotes the curvature radius of the i'th (i'th face) in order from the object side, Di denotes the lens thickness and air interval of the i'th face and the i'th, and Ni and vi are the refractive index and Abbe number of a material with a d-line as a reference, respectively. Also, the relations between the above-mentioned respective conditional expressions and numerical embodiments are shown in Table 1.

When assuming that the optical axial direction is an X axis, the direction perpendicular to the optical axis is an H axis, the advancing direction of light is positive, R is a paraxial radius of curvature, and K, B, C, D, and E are aspherical coefficients respectively, an aspherical shape is represented with the following expression.

$$X = \frac{(1/R)H^2}{1 + \sqrt{1 - (1+K)(H/R)^2}} + BH^4 + CH^6 + DH^8 + EH^{10}$$ [Expression 2]

Also, the diffraction optical face according to the present invention is represented with the following expression. Assuming that the phase is φ(h), $$\phi(h) = 2\pi/\lambda (C2 \cdot h2)$$

wherein λ denotes a reference wavelength (d-line), and h denotes the distance from the optical axis.

First Numerical Embodiment
f = 6.10~104.00 Fno = 2.85~3.99 2ω = 60.6°~3.9°

| | | | |
|---|---|---|---|
| R1 = 81.394 | D1 = 1.60 | N1 = 1.806100 | v1 = 33.3 |
| R2 = 38.009 (diffraction face) | D2 = 4.50 | N2 = 1.487490 | v2 = 70.2 |
| R3 = −1023.597 | D3 = 0.20 | | |
| R4 = 35.708 | D4 = 3.90 | N3 = 1.487490 | v3 = 70.2 |
| R5 = 418.621 | D5 = 0.20 | | |
| R6 = 36.184 | D6 = 2.00 | N4 = 1.487490 | v4 = 70.2 |
| R7 = 56.284 | D7 = variable | | |
| R8 = 62.609 | D8 = 0.90 | N5 = 1.882997 | v5 = 40.8 |
| R9 = 8.417 | D9 = 4.52 | | |
| R10 = −20.991 | D10 = 0.75 | N6 = 1.603112 | v6 = 60.6 |
| R11 = 35.844 | D11 = 0.20 | | |
| R12 = 18.033 | D12 = 1.90 | N7 = 1.922860 | v7 = 18.9 |
| R13 = 71.769 | D13 = variable | | |
| R14 = aperture | D14 = 8.76 | | |
| R15 = 8.958 | D15 = 2.50 | N8 = 1.772499 | v8 = 49.6 |
| R16 = 63.956 | D16 = 1.85 | | |
| R17 = 15.673 | D17 = 0.70 | N9 = 1.846660 | v9 = 23.9 |
| R18 = 6.792 | D18 = 0.98 | | |
| R19 = 23.154 | D19 = 1.40 | N10 = 1.487490 | v10 = 70.2 |
| R20 = 180.990 | D20 = 1.20 | | |
| R21 = flare-cut iris | D21 = variable | | |
| R22 = 15.975 | D22 = 2.50 | N11 = 1.518229 | v11 = 58.9 |
| R23 = −12.118 (diffraction face) | D23 = 0.60 | N12 = 1.772499 | v12 = 49.6 |
| R24 = −29.625 | D24 = variable | | |
| R25 = ∞ | D25 = 0.80 | N13 = 1.516330 | v13 = 64.1 |
| R26 = ∞ | | | |

First Numerical Embodiment
f = 6.10~104.00 Fno = 2.85~3.99 2ω = 60.6°~3.9°

| | focal length | | |
|---|---|---|---|
| variable interval | 6.10 | 39.30 | 104.00 |
| D7 | 0.80 | 25.01 | 33.59 |
| D13 | 29.45 | 8.14 | 2.13 |
| D21 | 5.00 | 3.38 | 15.55 |
| D24 | 7.00 | 14.38 | 1.40 | aspherical coefficient

| | | | |
|---|---|---|---|
| R15 | k = −2.94241 | B = 4.29441e−4 | C = −4.84425e−6 |
| | D = 1.25873e−7 | E = −1.96953e−9 | |
| R22 | k = −7.76517 | B = 2.55931e−4 | C = −1.12751e−6 | phase coefficient

| | |
|---|---|
| two faces | C2 = −9.2117e−5 |
| twenty-three faces | C2 = −6.33713e−4 |

Second Numerical Embodiment
f = 6.10~97.80 Fno = 2.85~3.95 2ω = 60.6°~4.2°

| | | | |
|---|---|---|---|
| R1 = 75.174 | D1 = 1.40 | N1 = 1.806100 | v1 = 33.3 |
| R2 = 35.060 (diffraction face) | D2 = 5.20 | N2 = 1.487490 | v2 = 70.2 |
| R3 = −215.348 | D3 = 0.20 | | |
| R4 = 31.682 | D4 = 4.10 | N3 = 1.603112 | v3 = 60.6 |
| R5 = 123.855 | D5 = variable | | |
| R6 = 49.655 | D6 = 0.90 | N4 = 1.882997 | v4 = 40.8 |
| R7 = 8.681 | D7 = 4.79 | | |
| R8 = −23.532 | D8 = 0.75 | N5 = 1.603112 | v5 = 60.6 |
| R9 = 38.960 | D9 = 0.20 | | |
| R10 = 18.157 | D10 = 1.90 | N6 = 1.922860 | v6 = 18.9 |
| R11 = 58.411 | D11 = variable | | |
| R12 = aperture | D12 = 8.76 | | |
| R13 = 9.450 | D13 = 2.50 | N7 = 1.772499 | v7 = 49.6 |
| R14 = 84.703 | D14 = 1.85 | | |
| R15 = 16.697 | D15 = 0.70 | N8 = 1.846660 | v8 = 23.9 |
| R16 = 7.239 | D16 = 0.98 | | |
| R17 = 26.238 | D17 = 1.40 | N9 = 1.487490 | v9 = 70.2 |
| R18 = −367.715 | D18 = 0.50 | | |
| R19 = flare-cut iris | D19 = variable | | |
| R20 = 17.564 | D20 = 2.50 | N10 = 1.516330 | v10 = 64.1 |
| R21 = −41.074 (diffraction face) | D21 = 0.60 | N11 = 1.772499 | v11 = 49.6 |
| R22 = −78.230 | D22 = variable | | |
| R23 = ∞ | D23 = 0.80 | N12 = 1.498310 | v12 = 65.1 |
| R24 = ∞ | | | |

| | focal length | | |
|---|---|---|---|
| variable interval | 6.10 | 38.32 | 97.80 |
| D5 | 0.80 | 26.86 | 35.96 |
| D11 | 31.94 | 8.78 | 2.24 |
| D19 | 6.00 | 4.91 | 16.24 |
| D22 | 6.00 | 12.85 | 0.72 | aspherical coefficient

| | | | |
|---|---|---|---|
| R13 | k = −4.21927 | B = 5.40575e−4 | C = −7.88847e−6 |
| | D = 1.45357e−7 | E = −1.65364e−9 | |
| R20 | k = −6.81291 | B = 1.57658e−4 | C = −4.99286e−7 | phase coefficient

| | |
|---|---|
| two faces | C2 = −1.0277e−4 |
| twenty-one faces | C2 = −6.944d−4 |

Third Numerical Embodiment
f = 34.60~155.00 Fno = 4.12~5.77 2ω = 64.0°~15.9°

| | | | |
|---|---|---|---|
| R1 = 200.758 | D1 = 4.00 | N1 = 1.846680 | ν1 = 23.9 |
| R2 = 97.459 (diffraction face) | D2 = 8.50 | N2 = 1.638539 | ν2 = 55.4 |
| R3 = 2953.469 | D3 = 0.20 | | |
| R4 = 77.444 | D4 = 6.50 | N3 = 1.712995 | ν3 = 53.9 |
| R5 = 168.405 | D5 = variable | | |
| R6 = 137.914 | D6 = 2.30 | N4 = 1.772499 | ν4 = 49.6 |
| R7 = 21.134 | D7 = 9.36 | | |
| R8 = −263.959 | D8 = 2.50 | N5 = 1.882997 | ν5 = 40.8 |
| R9 = 57.025 | D9 = 0.20 | | |
| R10 = 33.116 | D10 = 6.70 | N6 = 1.805181 | ν6 = 25.4 |
| R11 = −151.512 | D11 = 0.60 | | |
| R12 = −87.303 | D12 = 1.70 | N7 = 1.670029 | ν7 = 47.2 |
| R13 = 86.486 | D13 = variable | | |
| R14 = aperture | D14 = 6.59 | | |
| R15 = 137.778 | D15 = 1.50 | N8 = 1.712995 | ν8 = 53.9 |
| R16 = 28.866 | D16 = 5.50 | N9 = 1.487490 | ν9 = 70.2 |
| R17 = −86.148 | D17 = 0.25 | | |
| R18 = 40.249 | D18 = 7.00 | N10 = 1.487490 | ν10 = 70.2 |
| R19 = −24.238 | D19 = 1.38 | N11 = 1.698947 | ν11 = 30.1 |
| R20 = −39.354 | D20 = variable | | |
| R21 = −100.568 | D21 = 4.10 | N12 = 1.805181 | ν12 = 25.4 |
| R22 = −29.570 | D22 = 1.50 | N13 = 1.743997 | ν13 = 44.8 |
| R23 = 120.580 | D23 = 9.60 | | |
| R24 = −36.779 | D24 = 2.38 | N14 = 1.603112 | ν14 = 60.6 |
| R25 = −56.686 | D25 = variable | | |
| R26 = 161.283 | D26 = 9.00 | N15 = 1.570989 | ν15 = 50.8 |
| R27 = −37.521 | D27 = 0.30 | | |
| R28 = −120.394 | D28 = 6.00 | N16 = 1.639300 | ν16 = 44.9 |
| R29 = −46.399 (diffraction face) | D29 = 1.80 | | |
| R30 = −33.596 | D30 = 2.20 | N17 = 1.846660 | ν17 = 23.9 |
| R31 = −74.424 | D31 = variable | | |

| | focal length | | |
|---|---|---|---|
| variable interval | 34.60 | 111.66 | 155.00 |
| D5 | 3.75 | 48.49 | 61.60 |
| D13 | 39.99 | 10.31 | 1.45 |
| D20 | 2.61 | 12.68 | 13.91 |
| D25 | 18.38 | 4.90 | 2.70 | aspherical coefficient

| | | | |
|---|---|---|---|
| R27 | k = 4.92522e−1 | B = 2.13209e−6 | C = −6.68465e−11 |
| | D = 3.42029e−12 | E = −4.67615e−15 | | phase coefficient

| | |
|---|---|
| two faces | C2 = −1.6956e−4 |
| twenty-nine faces | C2 = −1.5e−4 |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-049012 filed Feb. 28, 2007, which is hereby incorporated by reference herein in its entirety.

What is claimed is:

1. A zoom lens comprising:
   a first lens unit having positive refractive power and being disposed closest to an object side;
   an aperture disposed closer to an image side than the first lens unit; and
   a rear lens group including one or more lens units at the image side of the aperture,
   wherein the first lens unit and at least one lens unit among the rear lens group are moved at the time of zooming,
   wherein the first lens unit includes a first diffraction optical part having positive power, the rear lens group includes a second diffraction optical part having positive power, and
   wherein when assuming that the focal length of the first diffraction optical part is fd1, the focal length of the second diffraction optical part is fd2, the distance between the first diffraction optical part and the aperture is L1 at the telephoto end, the distance between the second diffraction optical part and the aperture is L2 at the wide-angle end, and the focal length of the entire system at the wide-angle end and telephoto end are fw and ft respectively, the following conditional expressions are satisfied $$4.0 < fd1/fd2 < 15.0$$

$$0.3 < L1/ft < 0.9$$

$$1.5 < L2/fw < 7.0.$$

2. The zoom lens according to claim 1, wherein the following conditional expression is satisfied:

$$50.0 < fd1/ft < 500.0.$$

3. The zoom lens according to claim 1, wherein the following conditional expression is satisfied:

$$80.0 < fd2/fw < 500.0.$$

TABLE 1

| | Conditional Expression 1 fd1/fd2 | Conditional Expression 2 L1/fT | Conditional Expression 3 L2/fW | Conditional Expression 4 fd1/fT | Conditional Expression 5 fd2/fW | Conditional Expression 6 f1/ft |
|---|---|---|---|---|---|---|
| First Embodiment | 6.879 | 0.527 | 4.080 | 88.823 | 220.124 | 0.494 |
| Second Embodiment | 6.757 | 0.575 | 4.129 | 84.663 | 200.884 | 0.557 |
| Third Embodiment | 8.847 | 0.656 | 2.199 | 323.775 | 163.956 | 0.926 |

4. The zoom lens according to claim 1, wherein the following conditional expression is satisfied when assuming that the focal length of the first lens unit is f1:

$$0.3 < f1/ft < 1.5.$$

5. An image pickup apparatus comprising:

the zoom lens according to claim 1; and a solid-state image pickup element configured to photo-receive an image formed by the zoom lens.

6. A zoom lens comprising in order from an object side to an image side:

a first lens unit having positive refractive power;

a second lens unit having negative refractive power;

an aperture;

a third lens unit having positive refractive power; and a fourth lens unit having positive refractive power, wherein the first through fourth lens unit are moved at the time of zooming, wherein the first lens unit includes a first diffraction optical part having positive power, the fourth lens unit includes a second diffraction optical part having positive power, and wherein when assuming that the focal length of the first diffraction optical part is fd1, the focal length of the second diffraction optical part is fd2, the distance between the first diffraction optical part and the aperture is L1 at the telephoto end, the distance between the second diffraction optical part and the aperture is L2 at the wide-angle end, and the focal length of the entire zoom lens at the wide-angle end and telephoto end are fw and ft respectively, the following conditional expressions are satisfied $$4.0 < fd1/fd2 < 15.0$$

$$0.3 < L1/ft < 0.9$$

$$1.5 < L2/fw < 7.0.$$

7. The zoom lens according to claim 5, wherein the following conditional expression is satisfied when assuming that the focal length of the first lens unit is f1:

$$50.0 < fd1/ft < 500.0$$

$$80.0 < fd2/fw < 500.0$$

$$0.3 < f1/ft < 1.5.$$

8. A zoom lens comprising in order from the object side to the image side:

a first lens unit having positive refractive power;

a second lens unit having negative refractive power;

an aperture;

a third lens unit having positive refractive power;

a fourth lens unit having negative refractive power; and a fifth lens unit having positive refractive power, wherein the first through fifth lens unit are moved at the time of zooming;

wherein the first lens unit includes a first diffraction optical part having positive power, the fifth lens unit includes a second diffraction optical part having positive power, and wherein when assuming that the focal length of the first diffraction optical part is fd1, the focal length of the second diffraction optical part is fd2, the distance between the first diffraction optical part and the aperture is L1 at the telephoto end, the distance between the second diffraction optical part and the aperture is L2 at the wide-angle end, and the focal length of the entire system at the wide-angle end and telephoto end are fw and ft respectively, the following conditional expressions are satisfied $$4.0 < fd1/fd2 < 15.0$$

$$0.3 < L1/ft < 0.9$$

$$1.5 < L2/fw < 7.0.$$

9. The zoom lens according to claim 8, wherein the following conditional expression is satisfied when assuming that the focal length of the first lens unit is f1:

$$50.0 < fd1/ft < 500.0$$

$$80.0 < fd2/fw < 500.0$$

$$0.3 < f1/ft < 1.5.$$

* * * * *